United States Patent
Noda et al.

(10) Patent No.: US 9,202,187 B2
(45) Date of Patent: Dec. 1, 2015

(54) PLANT OPERATION SUPPORT SYSTEM, PLANT OPERATION SUPPORT PROGRAM, AND PLANT OPERATION SUPPORT METHOD

(75) Inventors: Hideki Noda, Saku (JP); Reiko Obara, Kawasaki (JP); Takenori Kobayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 604 days.

(21) Appl. No.: 13/612,605

(22) Filed: Sep. 12, 2012

(65) Prior Publication Data

US 2013/0006432 A1   Jan. 3, 2013

Related U.S. Application Data

(63) Continuation of application No. PCT/JP2011/001493, filed on Mar. 15, 2011.

(30) Foreign Application Priority Data

Mar. 18, 2010   (JP) .................................. 2010-061919

(51) Int. Cl.
*G05D 11/00* (2006.01)
*G06Q 10/06* (2012.01)
(Continued)

(52) U.S. Cl.
CPC ............... *G06Q 10/06* (2013.01); *G06Q 50/06* (2013.01); *B01D 53/62* (2013.01); *B01D 2257/504* (2013.01); *Y04S 10/54* (2013.01)

(58) Field of Classification Search
CPC ...................................................... G05B 15/00
USPC ............................. 700/291; 60/645; 702/184
See application file for complete search history.

(56) References Cited

U.S. PATENT DOCUMENTS 4,653,276 A * 3/1987 Sugano et al. ................... 60/665
6,370,865 B1 * 4/2002 Sasaki et al. ................... 60/39.5
(Continued)

FOREIGN PATENT DOCUMENTS

JP   5-44902     2/1993
JP   2002-364457  12/2002
(Continued)

OTHER PUBLICATIONS

International Search Report from the Japanese Patent Office in International Application No. PCT/JP2011/001493 mailed Jun. 21, 2011.
(Continued)

*Primary Examiner* — Robert Fennema
*Assistant Examiner* — Anthony Whittington
(74) *Attorney, Agent, or Firm* — Finnegan, Henderson, Farabow, Garrett & Dunner, L.L.P.

(57) ABSTRACT

A plant operation support system of one embodiment includes a condition setting unit, a characteristic data storage unit, and a predicting unit. The condition setting unit sets a power supply amount to be supplied from the plant to an outside, and a target recovery rate of carbon dioxide to be generated by the thermal power generation facility. The characteristic data storage unit stores characteristic data representing a capability of recovering carbon dioxide by the carbon dioxide recovery facility, which varies according to operating output of the thermal power generation facility. The predicting unit predicts a fuel consumption amount in the thermal power generation facility and a recovery amount of carbon dioxide in the carbon dioxide recovery facility based on contents set by the condition setting unit and contents stored in the characteristic data storage unit.

17 Claims, 17 Drawing Sheets

(51) Int. Cl.
*G06Q 50/06* (2012.01)
*B01D 53/62* (2006.01)

(56) References Cited

U.S. PATENT DOCUMENTS

| | | | |
|---|---|---|---|
| 6,691,065 B2* | 2/2004 | Hayashi et al. | 702/184 |
| 7,678,351 B2* | 3/2010 | Iyer et al. | 423/175 |
| 2006/0178782 A1* | 8/2006 | Pechtl et al. | 700/286 |
| 2006/0248890 A1* | 11/2006 | Iijima et al. | 60/645 |
| 2011/0011088 A1* | 1/2011 | Iijima et al. | 60/645 |

FOREIGN PATENT DOCUMENTS

| | | |
|---|---|---|
| JP | 2004-237167 | 8/2004 |
| JP | 2006-350401 | 12/2006 |
| JP | 4035451 | 11/2007 |
| JP | 2009-30476 | 2/2009 |

OTHER PUBLICATIONS

Patent Examination Report No. 1 issued by the Australian Patent Office on Aug. 12, 2013, for Australian Patent Application No. 2011228527.

* cited by examiner

NOTE 1: [1] TO [4] ARE CHARACTERISTIC DATA, <1> TO <4> ARE SET ITEMS

NOTE 2: "T" IS UNIT PERIOD SUCH AS YEAR, MONTH, DAY, TIME, MINUTE, AND/OR THE LIKE WHICH ARE INPUT AND SET IN ADVANCE

PLANT OPERATION SUPPORT SYSTEM, PLANT OPERATION SUPPORT PROGRAM, AND PLANT OPERATION SUPPORT METHOD

CROSS-REFERENCE TO RELATED APPLICATIONS

This application is a continuation of prior International Application No. PCT/JP2011/001493 filed on Mar. 15, 2011, which is based upon and claims the benefit of priority from Japanese Patent Application No. 2010-061919 filed on Mar. 18, 2010; the entire contents of all of which are incorporated herein by reference.

FIELD

Embodiments described herein relate generally to a plant operation support system, a plant operation support program, and a plant operation support method which are useful when operating a thermal power generation plant having a recovery facility of carbon dioxide.

BACKGROUND

There has been proposed an operating method of a separation recovery system of $CO_2$ utilizing a steel plant facility. In this operating method, by-product gas and exhaust heat generated from the steel plant facility in an iron-making process are supplied to a business owner side facility pertaining to the steel plant facility.

In the business owner side facility, $CO_2$ is separated and recovered from the by-product gas by utilizing the supplied exhaust heat. At this time, the supply amounts of the by-product gas and the exhaust heat are measured, and a running cost is charged to the business owner side according to the measured supply amounts. As a result, operation of separation and recovery system of $CO_2$ is established as a business enterprise.

Further, installing a $CO_2$ recovery facility as described above in a thermal power generation plant is in progress. In a thermal power generation plant having the $CO_2$ recovery facility, it is demanded to predict the recovery amount of $CO_2$ which is generated as exhaust gas during thermal power generation, the fuel consumption amount, and so on, assuming trading of what is called a $CO_2$ emission right.

Here, the $CO_2$ recovery facility installed in the thermal power generation plant is assumed to operate by using as power sources, for example, a part of steam which is a power source of a steam turbine generator and a part of power which is actually generated. Accordingly, when operating output (power of operation) of the aforementioned steam turbine generator or the like is varied, the temperature of steam supplied to the $CO_2$ recovery facility side, the state of pressure, and the like also vary. Accompanying this variation, the capability of recovering $CO_2$ by the $CO_2$ recovery facility also varies.

That is, when the temperature of steam and the state of pressure vary, the efficiency of collecting heat from steam also varies, and thus optimal conditions for operating the $CO_2$ recovery facility efficiently also vary. Therefore, to predict the above-described recovery amount of $CO_2$ and fuel consumption amount with high accuracy, a prediction calculation considering the variation of the state of steam which varies according to the operating output of the steam turbine generator or the like, that is, thermal energy amount supplied to the $CO_2$ recovery facility side, or the like is necessary.

As a method of predicting the recovery amount of $CO_2$, for example, in a report by IPCC (Intergovernmental Panel On Climate Change), a prediction calculation method and the like using fixed values, such as an average value or a representative value, as conditional values representing operating conditions or the like of equipment are currently applied. In consideration of such a situation, the operating side of the thermal power generation plant desires to comprehend optimal operating conditions of the thermal power generation facility which can realize efficient recovery of $CO_2$ and efficient fuel consumption.

DETAILED DESCRIPTION

A plant operation support system of one embodiment supports operation of a plant including a thermal power generation facility and a carbon dioxide recovery facility which uses thermal energy of a part of a power source of the thermal power generation facility and a part of generated electric power as a power source, and includes a condition setting unit, a characteristic data storage unit, and a predicting unit. In this plant operation support system, the condition setting unit sets a power supply amount to be supplied from the plant to an outside, and a target recovery rate of carbon dioxide to be generated by the thermal power generation facility. The characteristic data storage unit stores characteristic data representing a capability of recovering carbon dioxide by the carbon dioxide recovery facility, which varies according to operating output of the thermal power generation facility. The predicting unit predicts a fuel consumption amount in the thermal power generation facility and a recovery amount of carbon dioxide in the carbon dioxide recovery facility based on contents set by the condition setting unit and contents stored in the characteristic data storage unit.

Hereinafter, embodiments for carrying out the present invention will be described based on the drawings.

First Embodiment

Figure 1:
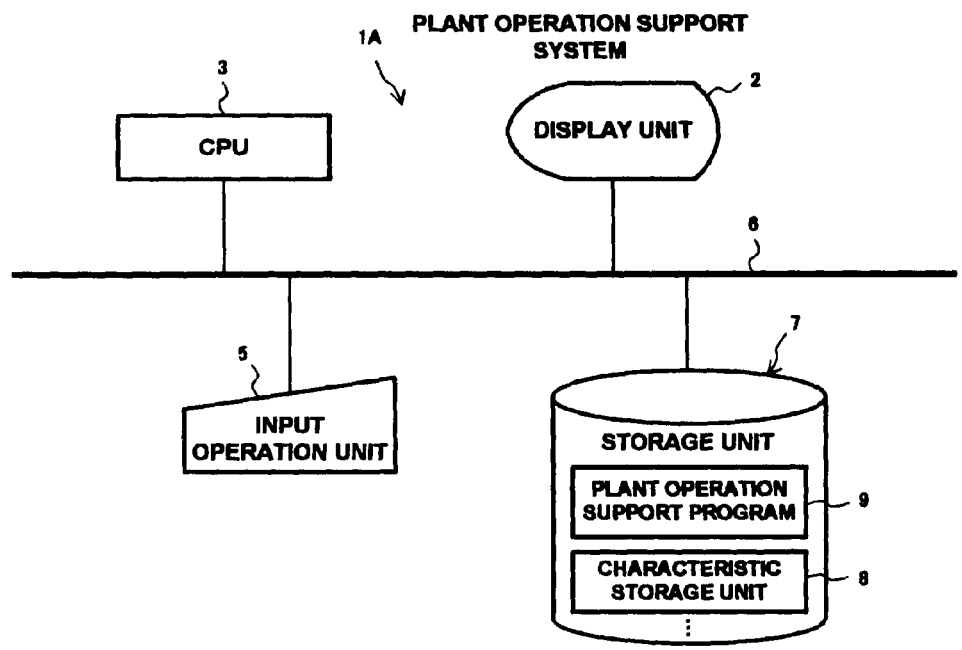
FIG. 1 is a functional block diagram illustrating a hardware structure of a plant operation support system according to a first embodiment.

As illustrated in FIG. 1, a plant operation support system 1A according to this embodiment is utilized preferably in a thermal power generation plant having a thermal power generation facility and a $CO_2$ recovery facility, and is capable of predicting a $CO_2$ (carbon dioxide) recovery amount and a fuel consumption amount. This plant operation support system 1A mainly includes as hardware a CPU 3, a storage unit 7, an input operation unit 5, and a display unit 2 which are connected via a bus 6.

The display unit 2 is realized by a display device such as a CRT or a liquid crystal display. The input operation unit 5 is structured of an input device such as a keyboard or a mouse for example, and accepts information which is inputted and operated by an operator. The storage unit 7 includes an external (auxiliary) storage device such as an HDD storing a plant operation support program 9 (program main body) and a main memory realized by a RAM or the like.

Figure 2:
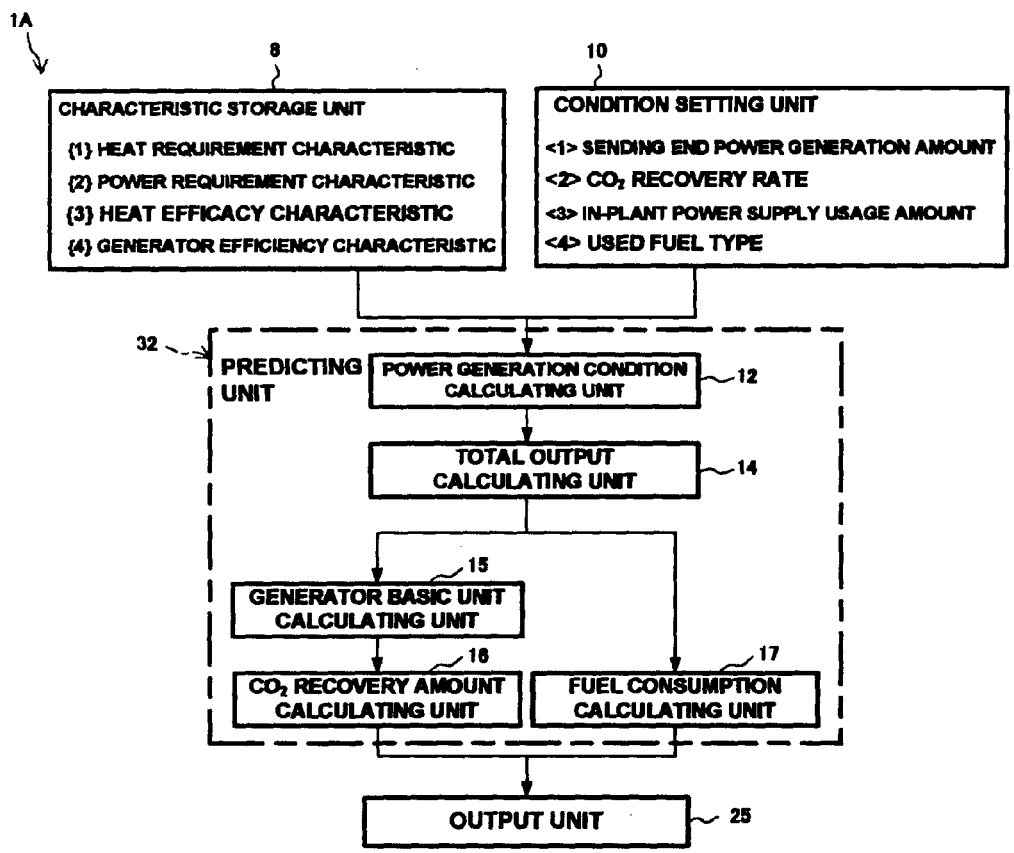
FIG. 2 is a functional block diagram illustrating a software structure of the plant operation support system of FIG. 1.

The CPU 3 loads the plant operation support program 9 stored in the external storage device on the main memory. As a result, as illustrated in FIG. 2, a characteristic storage unit 8 functioning as a characteristic data storage unit, a condition setting unit 10, a predicting unit 32, and an output unit 25 are realized by software. Note that these characteristic storage unit 8, condition setting unit 10, predicting unit 32, and output unit 25 may be realized by hardware in which electronic parts are combined.

Figure 3:
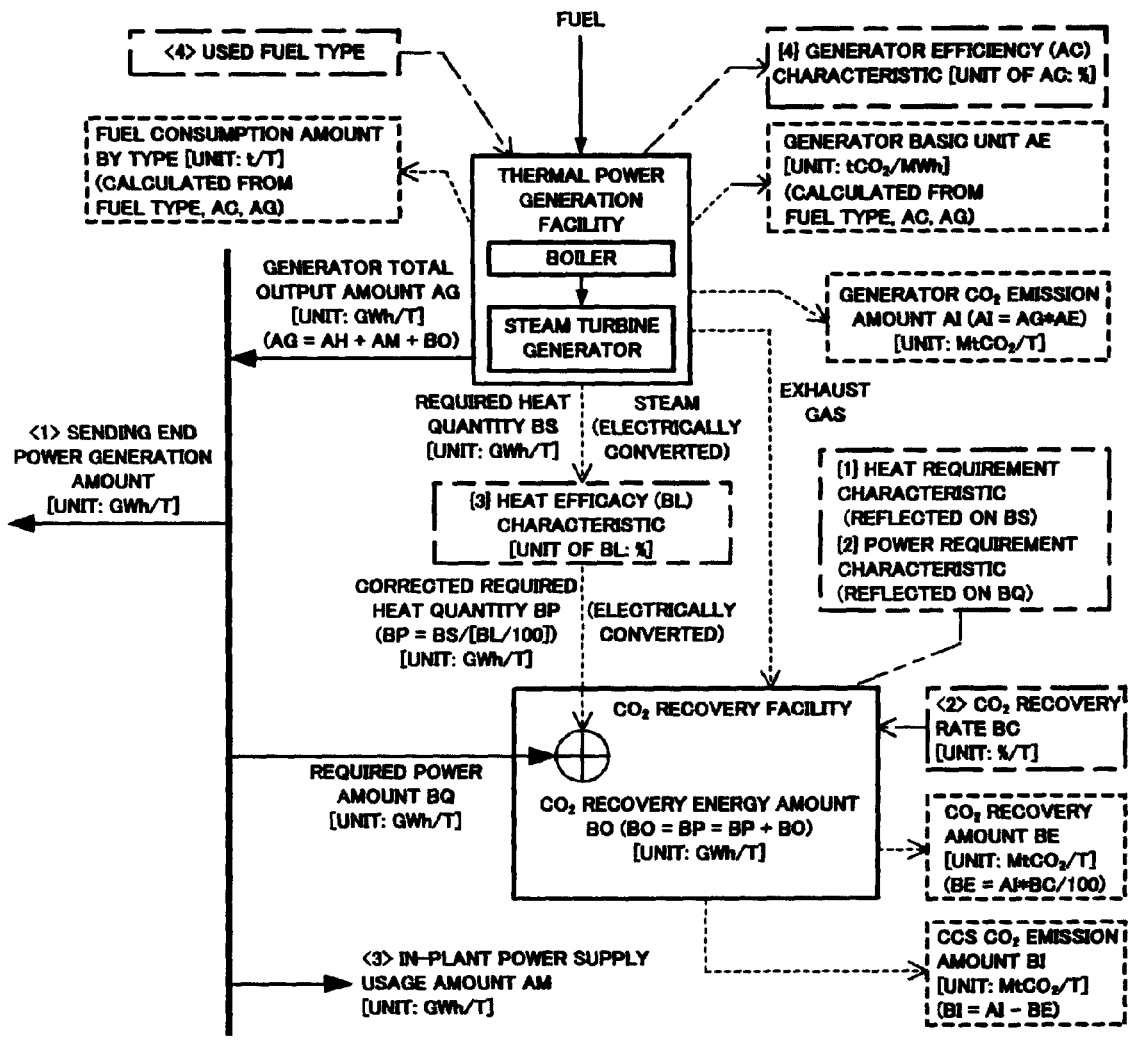
FIG. 3 is a diagram schematically illustrating the flow of processing for predicting a recovery amount of $CO_2$ and a fuel consumption amount in the plant operation support system of FIG. 1 and FIG. 2.

Here, the thermal power generation plant to which the plant operation support system 1A of this embodiment is applied is structured as follows. Specifically, as illustrated in FIG. 3, the above-described thermal power generation facility includes a steam turbine generator structured integrally of a steam turbine and a generator, a boiler generating steam as a power source of this steam turbine generator, and so on.

The $CO_2$ recovery facility recovers $CO_2$ from exhaust gas generated in the thermal power generation facility by applying, for example, a chemical absorption method. This $CO_2$ recovery facility using the chemical absorption method separates $CO_2$ by utilizing absorption and release characteristics of absorption liquid. The $CO_2$ recovery facility is operated by using as power sources a part of thermal energy which is a power source of the thermal power generation facility (steam turbine generator), that is, a part of a heat quantity obtained from steam generated by the boiler, and power generated by the steam turbine generator.

More specifically, the $CO_2$ recovery facility has, for example, an absorption tower and a regeneration tower. The exhaust gas is guided to the absorption tower first, and the absorption liquid absorbs carbon dioxide in the exhaust gas therein and becomes what is called a $CO_2$ rich solution. When this absorption liquid is heated in the regeneration tower, the carbon dioxide is released, and the liquid becomes a $CO_2$ lean solution again. By repeating this cycle, the $CO_2$ recovery facility separates and recovers $CO_2$ sequentially from the exhaust gas. Note that the $CO_2$ recovery facility may recover $CO_2$ from the exhaust gas by using a membrane separation method instead of the above-described chemical absorption method.

In the condition setting unit 10 included in the plant operation support system 1A, conditions inputted (specified) by an operator via the input operation unit 5 with reference to an interactive screen, which is GUI displayed on the display unit 2 for example, are set as described in FIG. 2. Specifically, in the condition setting unit 10, at least <1> sending end power generation amount [unit: GWh/T] and <2> $CO_2$ recovery rate [unit: %/T] inputted from the input operation unit 5 are set.

The <1> sending end power generation amount is a power supply amount (supplied power amount) to be supplied to the outside of the thermal power generation plant as a commercial power supply for example. Operating output (generator output) of the steam turbine generator is determined by corresponding to a value of the <1> sending end power generation amount set in this manner. The <2> $CO_2$ recovery rate represents a ratio of carbon dioxide by percentage as a recovery target from the whole carbon dioxide generated as exhaust gas from the thermal power generation facility.

Here, in the condition setting unit 10 of this embodiment, <3> in-plant power supply usage amount [unit: GWh/T] and <4> used fuel type are further set, which are inputted from the input operation unit 5. The <3> in-plant power supply usage amount is a power amount used for operating electric equipment and so on excluding the $CO_2$ recovery facility in the thermal power generation plant. Note that the <3> in-plant power supply usage amount can be considered as included in {4} generator efficiency characteristic [unit: %] which will be described later. Therefore, when the {4} generator efficiency characteristic is determined considering the power amount corresponding to the <3> in-plant power supply usage amount, setting (input) of the <3> in-plant power supply usage amount is omitted.

The <4> used fuel type represents the type (carbon species) used as fuel in the boiler of the thermal power generation facility. Note that as the fuel used in the boiler, crude oil, LNG (liquefied natural gas), or the like may be applied other than the carbon. In this case, the crude oil or LNG is added to the breakdown of used fuel type. Further, when values of $CO_2$ emission factor, net calorific value, and so on determined by carbon species are known in advance, the carbon species can be identified by inputting these values, and thus the setting (input) of the <4> used fuel type can be omitted.

On the other hand, the characteristic storage unit 8 stores at least {1} heat requirement characteristic, {2} power requirement characteristic, and {3} heat efficacy characteristic, which will be described later, as characteristic data. These characteristic data are information representing the $CO_2$ recovery capability of the $CO_2$ recovery facility which varies according to the value of operating output of the steam turbine generator (thermal power generation facility). The operating output (generator output) of the steam turbine generator is information representing what ratio of operating power the steam turbine generator is operated at by percentage with the rated operating power on the specification being the reference (100%).

Further, the characteristic storage unit 8 of this embodiment further stores {4} generator efficiency characteristic in addition to these characteristic data. This {4} generator efficiency characteristic is characteristic data representing the power generation efficiency of the steam turbine generator which varies according to the value of operating output of the steam turbine generator. Note that as such {4} generator efficiency characteristic, a fixed value (constant value) may be applied such that the power generation efficiency of the steam turbine generator is not changed according to the operating output of the steam turbine generator.

The $CO_2$ recovery facility of this embodiment is operated by using as power sources a part of thermal energy obtained from steam which is a power source of the steam turbine generator and a part of power which is actually generated, as described above. Accordingly, when the operating output of the steam turbine generator is varied, the temperature of steam and the state of pressure vary simultaneously, and the $CO_2$ recovery capability of the $CO_2$ recovery facility varies accompanying this. Specifically, when the temperature of steam and the state of pressure vary, the efficiency of collecting heat from steam (heat efficacy) varies as well, and hence optimal conditions for efficiently operating the $CO_2$ recovery facility also vary.

Figure 4:
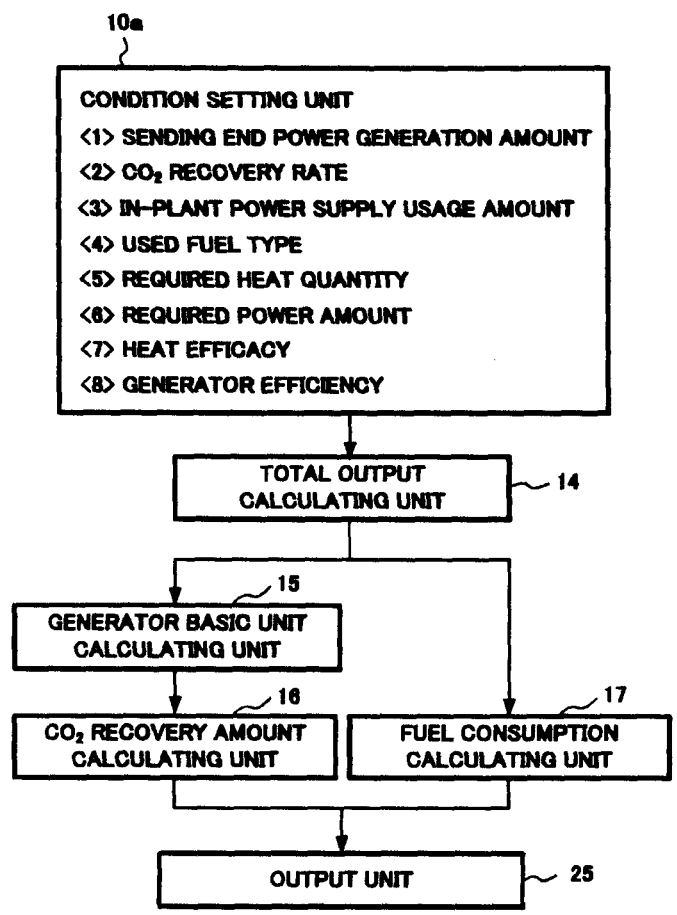
FIG. 4 is a functional block diagram illustrating a system structure of a reference example for comparing its structure with the plant operation support system of FIG. 1.

FIG. 4 illustrates a system of a reference example for comparing its structure with the plant operation support system 1A. The system of the reference example, which is different from the plant operation support system LA, does not have the characteristic storage unit 8 and a power generation condition calculating unit 12 which will be described later, and moreover includes a condition setting unit 10a instead of the condition setting unit 10. In the condition setting unit 10a, <5> required heat quantity (heat quantity obtained from steam needed for operating the $CO_2$ recovery facility), <6> required power amount (power amount needed for operating the $CO_2$ recovery facility), <7> heat efficacy, and <8> generator efficiency are set as fixed values (constant values), which correspond respectively to the above-described {1} heat requirement characteristic, {2} power requirement characteristic, {3} heat efficacy characteristic, and {4} generator efficiency characteristic.

Therefore, in the system of the reference example, the temperature of steam and the state of pressure which vary according to the operating output of the steam turbine generator, that is, variations of the heat energy amount to be supplied to the $CO_2$ recovery facility or the like are not considered. Thus, in the system of the reference example, for example, it is difficult to predict the $CO_2$ recovery amount and the fuel consumption amount with high accuracy.

On the other hand, the plant operation support system 1A of this embodiment further includes, as illustrated in FIG. 2, the characteristic storage unit 8 and the power generation condition calculating unit 12 included in the predicting unit 32, which are not included in the system of the reference example. In addition to the power generation condition calculating unit 12, the predicting unit 32 further has a total output calculating unit 14 and a $CO_2$ recovery amount calculating unit 16 as well as a generator basic unit calculating unit 15 and a fuel consumption calculating unit 17 which use the aforementioned {4} generator efficiency characteristic when performing calculation.

Figure 5:
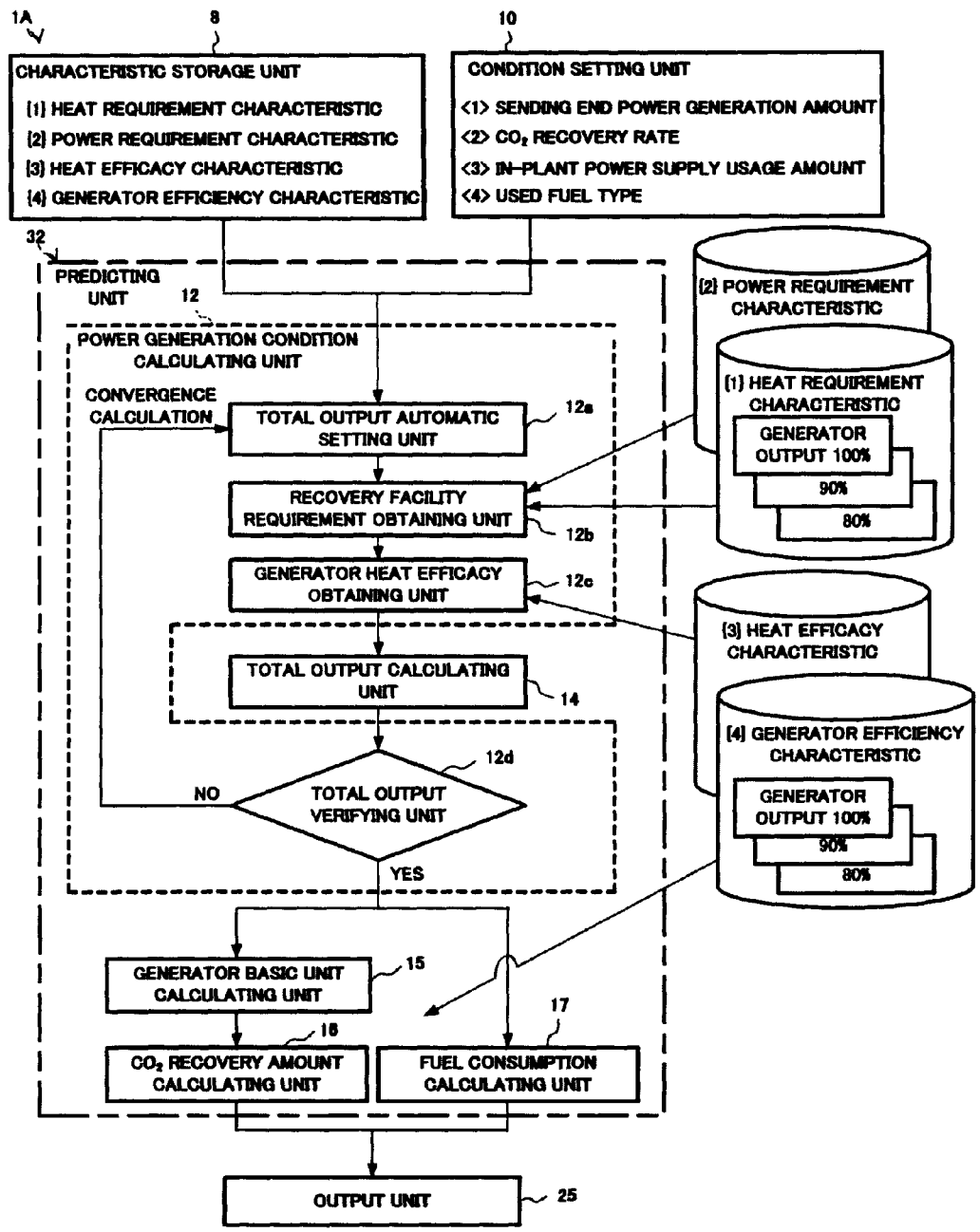
FIG. 5 is a diagram illustrating in more detail the flow of processing of the software structure and respective units of the plant operation support system of FIG. 2.

As illustrated in FIG. 5, the power generation condition calculating unit 12 has a total output automatic setting unit 12a, a recovery facility requirement obtaining unit 12b, a generator heat efficacy obtaining unit 12c, and a total output verifying unit 12d. The total output automatic setting unit 12a automatically sets an assumed value of a generator total output amount which will be described later. The recovery facility requirement obtaining unit 12b obtains a necessary heat quantity and a necessary power amount while referring to the {1} heat requirement characteristic and the {2} power requirement characteristic. The generator heat efficacy obtaining unit 12c obtains an efficiency of collecting heat from steam (heat efficacy) while referring to the {3} heat efficacy characteristic. The total output verifying unit 12d verifies calculation results from the total output calculating unit 14.

Figure 6A:
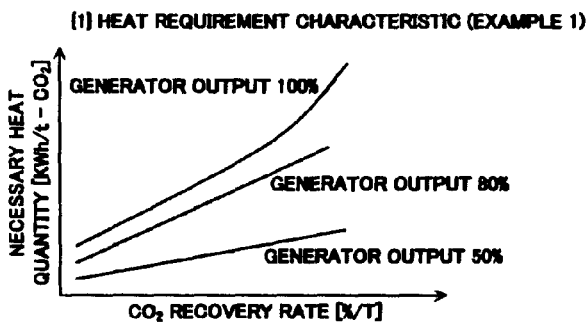
FIG. 6A is a diagram representing a heat requirement characteristic stored in a characteristic storage unit included in the plant operation support system of FIG. 5.

The {1} heat requirement characteristic, the {2} power requirement characteristic, the {3} heat efficacy characteristic, and the {4} generator efficiency characteristic stored in the characteristic storage unit 8 will be described one by one. As illustrated in FIG. 6A, the {1} heat requirement characteristic is characteristic data which can represent in graph form the relation between the <2> $CO_2$ recovery rate [%/T] and the necessary heat quantity [KWh/t–$CO_2$] which vary according to the value of the operating output (generator output) [%] of the steam turbine generator.

Figure 6B:
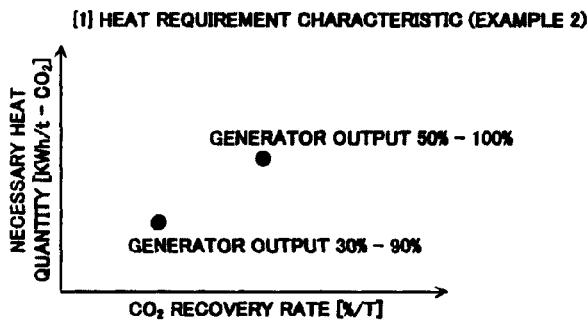
FIG. 6B is a diagram representing another heat requirement characteristic having a structure different from the heat requirement characteristic of FIG. 6A.

As illustrated in FIG. 6B, the {1} heat requirement characteristic may be characteristic data plotting the relation between the <2> $CO_2$ recovery rate and the necessary heat quantity according to the operating output (generator output) of the steam turbine generator by dots. In the exemplification (example 2) of FIG. 6B, it is applied to the case where there is an operating restriction not allowing operation that changes the $CO_2$ recovery rate. Further, the example of FIG. 6B assumes that two $CO_2$ recovery facilities are installed, and there exist two sets of plot data corresponding to both operating conditions, operating one facility and operating two facilities.

Here, "t–$CO_2$" in FIG. 6A and FIG. 6B are values obtained by converting various types of greenhouse effect gases ($CO_2$, methane, dinitrogen monoxide, and so on) into the greenhouse effect of $CO_2$ and are represented by unit t (ton). "KWh" is applied for turning the heat quantity used for operating the $CO_2$ recovery facility into an electrically converted amount. Note that "T" is a unit period such as year (for example, time interval for obtaining a yearly average value), month, day, time, minute, and/or the like inputted in advance via the input operation unit 5. That is, such {1} heat requirement characteristic is characteristic data (first recovery capability characteristic) representing the correlation between the $CO_2$ recovery rate of the $CO_2$ recovery facility and the power conversion amount of the heat quantity per unit mass, which is necessary for recovering greenhouse effect gases including $CO_2$, in a manner corresponding to the operating output of the thermal power generation facility.

As illustrated in FIG. 5 and FIG. 6A, the power generation condition calculating unit 12 determines the operating output of the steam turbine generator based on the value of, for example, the <1> sending end power generation amount set in the condition setting unit 10. Moreover, the recovery facility requirement obtaining unit 12b of the power generation condition calculating unit 12 obtains the necessary heat quantity corresponding to the <2> $CO_2$ recovery rate set in the condition setting unit 10 and the determined operating output while referring to the aforementioned {1} heat requirement characteristic.

Figure 7A:
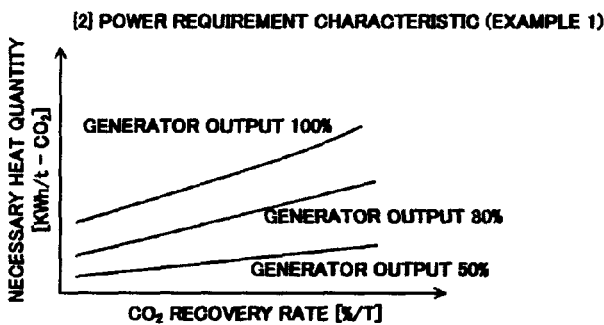
FIG. 7A is a diagram representing a power requirement characteristic stored in the characteristic storage unit included in the plant operation support system of FIG. 5.
Figure 7B:
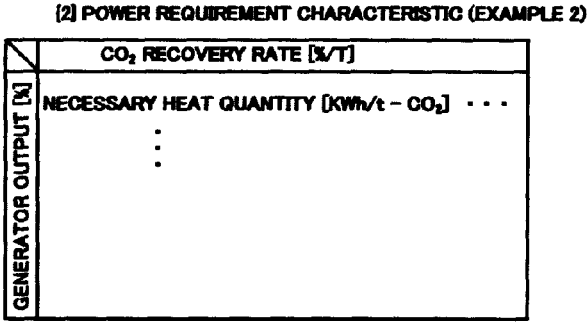
FIG. 7B is a diagram representing another power requirement characteristic having a structure different from the power requirement characteristic of FIG. 7A.

The {2} power requirement characteristic is, as illustrated in FIG. 7A, characteristic data which can represent in graph form the relation between the <2> $CO_2$ recovery rate [%/T] and the necessary power amount (power amount used for operating the $CO_2$ recovery facility) [KWh/t–$CO_2$] which vary according to the value of the operating output (generator output) [%] of the steam turbine generator. Further, the {2} power requirement characteristic may be, as illustrated in FIG. 7B, characteristic data which can represent in tabular form the relation between the <2> $CO_2$ recovery rate [%/T] and the necessary power amount which vary according to the operating output of the steam turbine generator.

That is, the {2} power requirement characteristic is characteristic data (second recovery capability characteristic) representing the correlation between the carbon dioxide recovery rate of the $CO_2$ recovery facility and the power amount per unit mass, which is necessary for recovering greenhouse effect gases including $CO_2$, in a manner corresponding to the operating output of the thermal power generation facility. Further, as illustrated in FIG. 5, FIG. 7A, and FIG. 7B, the generator heat efficacy obtaining unit 12c of the power generation condition calculating unit 12 obtains the necessary power amount corresponding to the determined operating output (generator output) of the steam turbine generator and the <2> $CO_2$ recovery rate set in the condition setting unit 10 with reference to the {2} power requirement characteristic.

Figure 8A:
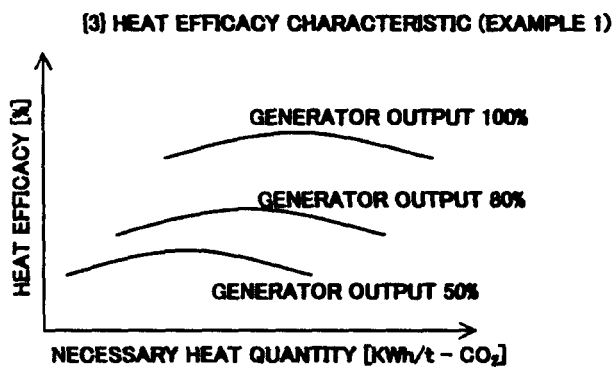
FIG. 8A is a diagram representing a heat efficacy characteristic stored in the characteristic storage unit included in the plant operation support system of FIG. 5.
Figure 8B:
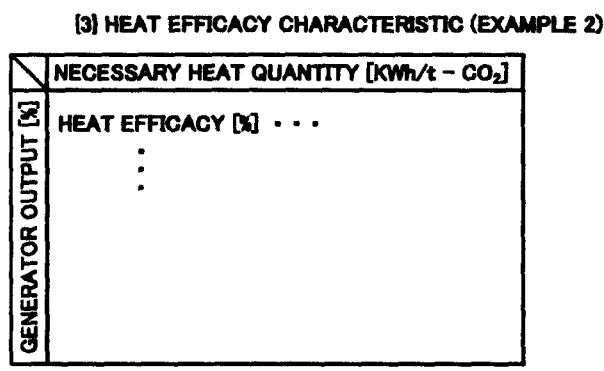
FIG. 8B is a diagram representing another heat efficacy characteristic having a structure different from the heat efficacy characteristic of FIG. 8A.

The {3} heat efficacy characteristic is, as illustrated in FIG. 8A, characteristic data which can represent in graph form the relation between the necessary heat quantity (electric conversion amount of heat used for operating the $CO_2$ recovery facility) [KWh/t–$CO_2$] and heat efficacy (efficiency of collecting heat from steam) [%] which vary according to the value of the operating output (generator output) [%] of the steam turbine generator. Further, the {3} heat efficacy characteristic may be, as illustrated in FIG. 8B, data which can represent in tabular form the relation between the necessary heat quantity and the heat efficacy which vary according to the operating output of the steam turbine generator.

That is, the {3} heat efficacy characteristic is characteristic data (third recovery capability characteristic) representing the correlation between the efficiency of collecting thermal energy from the thermal power generation facility and the power conversion amount of the heat quantity per unit mass, which is necessary for recovering greenhouse effect gases including carbon dioxide, in a manner corresponding to the operating output of the thermal power generation facility. As illustrated in FIG. 5, FIG. 8A, and FIG. 8B, the generator heat efficacy obtaining unit 12c of the power generation condition calculating unit 12 obtains the heat efficacy corresponding to the operating output (generator output) of the steam turbine generator and the necessary heat quantity determined as described above while referring to the {3} heat efficacy characteristic.

Therefore, regarding the {1} heat requirement characteristic, the {2} power requirement characteristic, and the {3} heat efficacy characteristic, as exemplified in FIG. 6A, FIG. 7A, and FIG. 8A, the correlation between the <2> $CO_2$ recovery rate (or heat efficacy) and a necessary (heat or) electric energy amount [KWh/t–$CO_2$] per unit mass of $CO_2$ conversion greenhouse effect gas varies according to the value of the operating output of the steam turbine generator. That is, these {1} heat requirement characteristic, {2} power requirement characteristic, and {3} heat efficacy characteristic are characteristic data representing the recovery capability of $CO_2$ in the $CO_2$ recovery facility which varies according to the value of the operating output (generator output) of the steam turbine generator.

Figure 9:
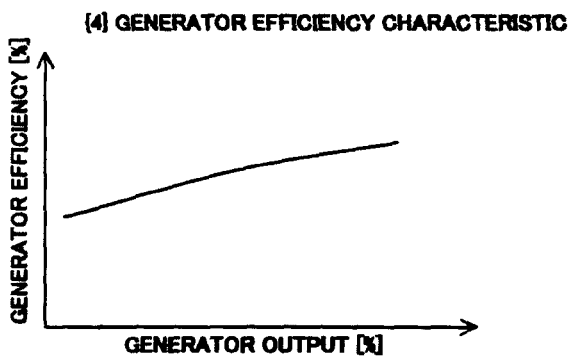
FIG. 9 is a diagram representing a generator efficiency characteristic stored in the characteristic storage unit included in the plant operation support system of FIG. 5.

The {4} generator efficiency characteristic is characteristic data representing the relation between the operating output [%] of the steam turbine generator and the generator efficiency [%] which is efficiency of power generation of the steam turbine generator. The power generation condition calculating unit 12 obtains the generator efficiency [%] corresponding to the operating output [%] of the steam turbine generator determined according to the value of the <1> sending end power generation amount, or the like, as illustrated in FIG. 5 and FIG. 9.

A function for predicting the $CO_2$ recovery amount and the fuel consumption amount which the plant operation support system 1A of this embodiment has will be described. The predicting unit 32 predicts the fuel consumption amount in the thermal power generation facility and the $CO_2$ recovery amount in the $CO_2$ recovery facility based on the contents of setting in the condition setting unit 10 and the contents stored in the characteristic storage unit 8, as illustrated in FIG. 5. The output unit 25 outputs information for visibly displaying the fuel consumption amount and the $CO_2$ recovery amount which are predicted by the predicting unit 32 on the display unit 2.

Specifically, as illustrated in FIG. 3 and FIG. 5, the power generation condition calculating unit 12 which the predicting unit 32 has calculates a corrected required heat quantity BP [GWh/T] and the $CO_2$ recovery energy amount BO [GWh/T] based on following Equation 1 and Equation 2, respectively.

$$BP=BS/\{BL/100\} \quad \text{Equation 1}$$

$$BO=BP+BQ \quad \text{Equation 2}$$

That is, the power generation condition calculating unit 12 obtains a required heat quantity BS [GWh/T] calculated by converting a necessary thermal energy amount per unit period T for operating the $CO_2$ recovery facility into electricity, based on the necessary heat quantity [KWh/t–$CO_2$] obtained by the recovery facility requirement obtaining unit 12b with reference to the {1} heat requirement characteristic. Moreover, the power generation condition calculating unit 12 substitutes a heat efficacy BL [%] obtained by the generator heat efficacy obtaining unit 12c with reference to the {3} heat efficacy characteristic into aforementioned Equation 1, thereby calculating the corrected required heat quantity BP [GWh/T] in which a loss of heat quantity is excluded from the required heat quantity BS [GWh/T].

Further, the power generation condition calculating unit 12 obtains the required power amount BQ [GWh/T] representing a necessary electric energy amount per unit period T for operating the $CO_2$ recovery facility based on the necessary power amount [KWh/t–$CO_2$] obtained by the recovery facility requirement obtaining unit 12b with reference to the {2} power requirement characteristic. Moreover, the power generation condition calculating unit 12 substitutes the obtained required power amount BQ [GWh/T] and the aforementioned corrected required heat quantity BP into Equation 2, thereby calculating the $CO_2$ recovery energy amount BO [GWh/T] in which the electric energy amount and the thermal energy amount needed for operating the $CO_2$ recovery facility are added up.

Further, as illustrated in FIG. 3 and FIG. 5, the total output calculating unit 14 calculates a generator total output amount AG by adding up the <1> sending end power generation amount AH [GWh/T], the in-plant power supply usage amount AM [GWh/T], and the aforementioned $CO_2$ recovery energy amount BO [GWh/T] based on following Equation 3.

$$AG=AH+AM+BO \quad \text{Equation 3}$$

That is, the generator total output amount AG represents the total output amount from the thermal power generation facility, which is the total sum of the total power generation amount generated in the steam turbine generator in the thermal power generation facility and the amount of steam (electric conversion amount of heat obtained from steam) to be supplied from the thermal power generation facility side to the $CO_2$ recovery facility side.

The generator basic unit calculating unit 15 calculates a generator basic unit AE [$tCO_2$/MWh] from the <4> used fuel type set in the condition setting unit 10, generator efficiency AC [%] obtained with reference to the {4} generator efficiency characteristic, and the generator total output amount AG [GWh/T] calculated in the total output calculating unit 14. Here, the "$tCO_2$" is a value representing the mass of $CO_2$ in units of t (ton). To calculate this, a publicly known method can be used such as the methodology of CDM (Clean Development Mechanism) in the Kyoto mechanism.

The $CO_2$ recovery amount calculating unit 16 calculates a generator $CO_2$ emission amount AI [$MtCO_2$/T], $CO_2$ recovery amount BE, and CCS (Carbon dioxide Capture and Storage) $CO_2$ emission amount BI [$MtCO_2$/T] based on following Equation 4 to Equation 6.

$$AI=AG*AE \quad \text{Equation 4}$$

$$BE=AI*BC/100 \quad \text{Equation 5}$$

$$BI=AI-BE \quad \text{Equation 6}$$

That is, as illustrated in FIG. 3 and FIG. 5, the $CO_2$ recovery amount calculating unit 16 integrates the generator basic unit AE [$tCO_2$/MWh] calculated in the generator basic unit calculating unit 15 and the generator total output amount AG [GWh/T] calculated in the total output calculating unit 14, so as to obtain the generator $CO_2$ emission amount AI [$MtCO_2$/T] representing the amount of $CO_2$ included in exhaust gas generated from the thermal power generation facility. Note that the $MtCO_2$ is a value representing the mass of $CO_2$ in units of Mt (megaton).

Further, as illustrated in FIG. 3 and FIG. 5, the $CO_2$ recovery amount calculating unit 16 calculates (predicts) the $CO_2$ recovery amount BE [$MtCO_2$/T] to be recovered in the $CO_2$ recovery facility by reflecting a $CO_2$ recovery rate BC [%/T] on the aforementioned generator $CO_2$ emission amount AI [$MtCO_2$/T] based on Equation 5. Moreover, the $CO_2$ recovery amount calculating unit 16 subtracts the $CO_2$ recovery amount BE [$MtCO_2$/T] from the generator $CO_2$ emission amount AI [$MtCO_2$/T] based on Equation 6, so as to obtain the CCS $CO_2$ emission amount BI [$MtCO_2$/T] considering, for example, storage of $CO_2$ in the ground.

The fuel consumption calculating unit 17 calculates (predicts) by using a publicly known method a fuel consumption amount by type AL [t/T] including the type of fuel consumed using the <4> used fuel type set in the condition setting unit 10, the generator efficiency AC [%] obtained with reference to the {4} generator efficiency characteristic, and the generator total output amount AG [GWh/T] calculated in the total output calculating unit 14.

Next, the flow of processing of predicting the $CO_2$ recovery amount ($CO_2$ recovery amount BE) and the fuel consumption amount (fuel consumption amount by type AL) by the plant operation support system 1A of this embodiment structured thus will be described based on FIG. 3 and FIG. 5.

As illustrated in FIG. 3 and FIG. 5, first, in the condition setting unit 10, the <1> sending end power generation amount AH, <2> $CO_2$ recovery rate, <3> in-plant power supply usage amount, and <4> used fuel type corresponding to the contents of input from the input operation unit 5 by the operator are set. The characteristic storage unit 8 stores and retains the {1} heat requirement characteristic, the {2} power requirement characteristic, the {3} heat efficacy characteristic, and the {4} generator efficiency characteristic.

The power generation condition calculating unit 12 of the predicting unit 32 obtains the generator total output amount AG ($AG_1$) by convergence calculation so that Δ becomes 0 based on following Equation 7.

$$\Delta=AG_1-(AH+AM+BO) \quad \text{Equation 7}$$

Specifically, as illustrated in FIG. 5, the total output automatic setting unit 12a of the power generation condition calculating unit 12 automatically sets an assumed value $AG_1$ of the generator total output amount in which, for example, a predetermined coefficient is integrated with the <1> sending end power generation amount AH. Here, the predetermined coefficient is a numeric value such as 1.2 (times) for example. Moreover, in the total output automatic setting unit 12a, as coefficients used next to the 1.2 (times), gradually increasing numeric values such as 1.25 (times), 1.30 (times)), 1.35 (times)), . . . , and gradually decreasing numeric values such as 1.15 (times), 1.10 (times), . . . are prepared. Numeric values increasing or decreasing gradually in this manner can be specified appropriately by, for example, an input operation from the input operation unit 5.

Here, the total output automatic setting unit 12a determines the operating output (generator output) [%] of the steam turbine generator corresponding to the assumed value $AG_1$ of the generator total output amount. Next, as illustrated in FIG. 5, the recovery facility requirement obtaining unit 12b of the power generation condition calculating unit 12 refers to the {1} heat requirement characteristic to obtain the necessary heat quantity [KWh/t–$CO_2$] corresponding to the determined operating output of the steam turbine generator and the set <2> $CO_2$ recovery rate. The recovery facility requirement obtaining unit 12b refers to the {2} power requirement characteristic to obtain the necessary power amount [KWh/t–$CO_2$] corresponding to the determined operating output of the steam turbine generator and the set <2> $CO_2$ recovery rate.

The generator heat efficacy obtaining unit 12c obtains the heat efficacy [%] based on the determined operating output of the steam turbine generator and the {3} heat efficacy characteristic. The power generation condition calculating unit 12 calculates the corrected required heat quantity BP [GWh/T] from the heat efficacy obtained in this manner and the necessary heat quantity. Moreover, the power generation condition calculating unit 12 adds up the required power amount BQ [GWh/T] calculated based on the necessary power amount [KWh/t–$CO_2$] and the corrected required heat quantity BP [GWh/T] to obtain the $CO_2$ recovery energy amount BO [GWh/T].

The total output calculating unit 14 adds up the <1> sending end power generation amount AH [GWh/T] and the in-plant power supply usage amount AM [GWh/T], which are set respectively, and the calculated $CO_2$ recovery energy amount BO [GWh/T] to calculate the generator total output amount AG.

Here, the total output verifying unit 12d compares the calculated value "AH+AM+BO (AG)" of the generator total output amount with the assumed value $AG_1$ of the generator total output amount which is tentatively set by the total output automatic setting unit 12a while referring to Equation 7. When there is a difference in these numeric values, the total output verifying unit 12d changes the assumed value $AG_1$ of the generator total output amount by changing the aforementioned coefficient to be integrated into the <1> sending end power generation amount AH.

Describing in more detail, as illustrated in FIG. 5, when the calculated value "AH+AM+BO (AG)" of the generator total output amount is smaller than the assumed value $AG_1$ for example as a result of verification by the total output verifying unit 12d (when the result of verification is NO), the total output automatic setting unit 12a changes the assumed value $AG_1$, for example, decreases it by 1%. The predicting unit 32 having such a power generation condition calculating unit 12 performs convergence calculation until the difference between the calculated value "AH+AM+BO" of the generator total output amount and the assumed value $AG_1$ becomes finally zero (A in Equation 7 becomes 0 and the result of verification becomes YES). Thus, the generator total output amount AG is obtained.

After the generator total output amount AG is obtained, as illustrated in FIG. 3 and FIG. 5, the generator basic unit calculating unit 15 calculates the generator basic unit AE [$tCO_2$/MWh] based on the <4> used fuel type, the generator efficiency AC [%] obtained with reference to the {4} generator efficiency characteristic, and the generator total output amount AG [GWh/T] obtained by the convergence calculation.

The $CO_2$ recovery amount calculating unit 16 integrates the generator basic unit AE [$tCO_2$/MWh] calculated in the generator basic unit calculating unit 15 and the generator total output amount AG [GWh/T] obtained by the convergence calculation to obtain the generator $CO_2$ emission amount AI [$MtCO_2$/T]. Moreover, the $CO_2$ recovery amount calculating unit 16 calculates (predicts) the $CO_2$ recovery amount BE [$MtCO_2$/T] recovered in the $CO_2$ recovery facility by reflecting the $CO_2$ recovery rate BC [%/T] on the obtained generator $CO_2$ emission amount AI [$MtCO_2$/T].

The fuel consumption calculating unit 17 calculates (predicts) the fuel consumption amount by type AL [t/T] based on the <4> used fuel type and the generator efficiency AC [%] and the generator total output amount AG [GWh/T] obtained by the convergence calculation. The output unit 25 displays on the display unit 2 the $CO_2$ recovery amount BE and the fuel consumption amount by type AL which are predicted in this manner.

As already described, the plant operation support system 1A of this embodiment is capable of obtaining the $CO_2$ recovery amount and the fuel consumption amount corresponding to the target sending end power generation amount to be transmitted to the outside from the thermal power generation plant having the $CO_2$ recovery facility and the $CO_2$ recovery rate as a target of recovery. That is, for example, even when the sending end power generation amount is changed and the operating output (steam condition) of the steam turbine generator in the thermal power generation facility is changed accompanying this, the plant operation support system 1A can predict the $CO_2$ recovery rate and the fuel consumption amount which vary corresponding thereto. Therefore, the plant operation support system 1A can reflect the predicted $CO_2$ recovery amount and fuel consumption amount on the actual operation of the thermal power generation plant. Thus, efficient operation of the thermal power generation plant is supported.

Second Embodiment

A second embodiment will be described based on FIG. 10. Note that in FIG. 10, the same components as those illustrated in FIG. 2 and FIG. 5 of the first embodiment are denoted by the same numerals, and description thereof is omitted.

Figure 10:
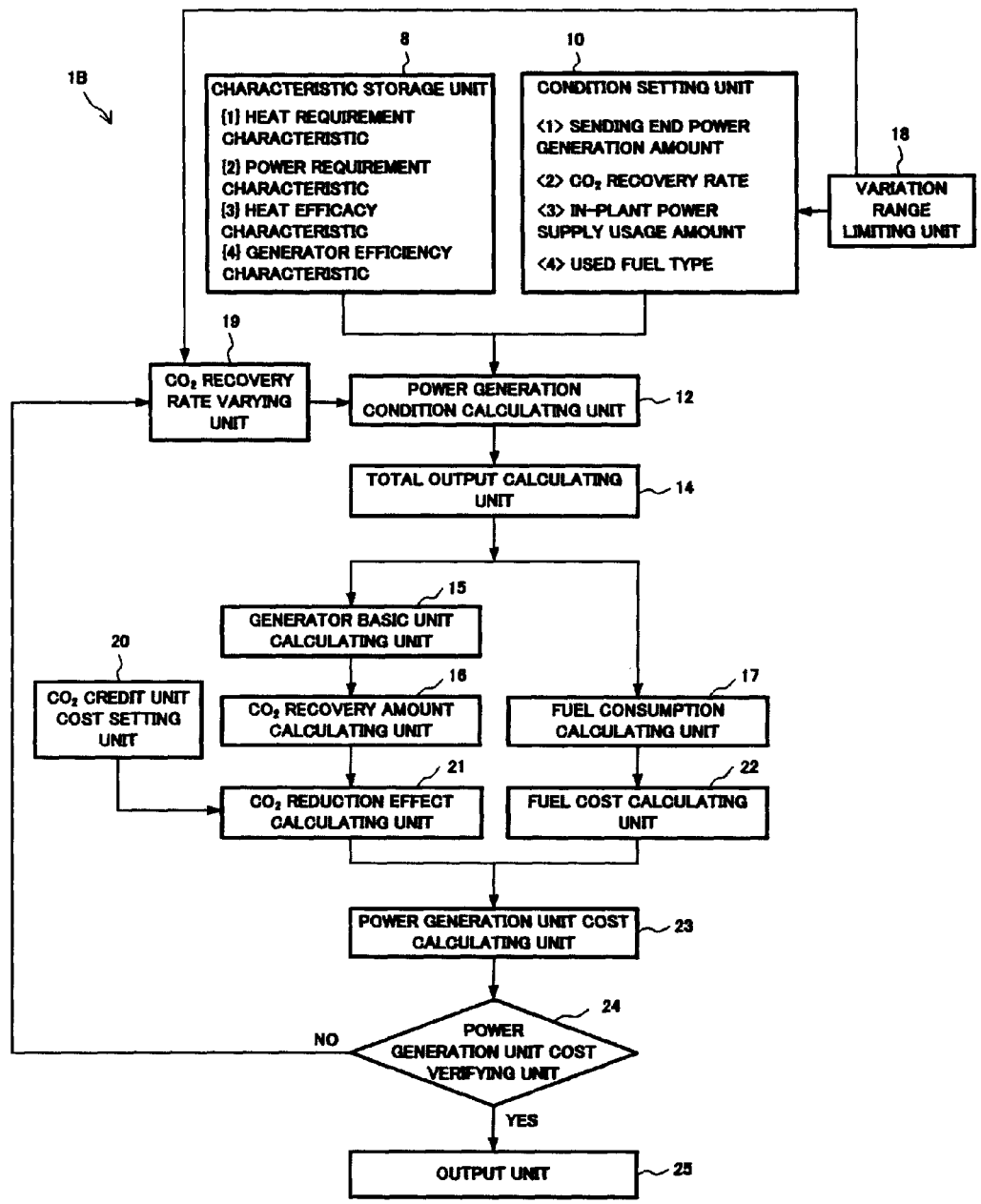
FIG. 10 is a functional block diagram illustrating a plant operation support system according to a second embodiment.

As illustrated in FIG. 10, a plant operation support system 1B of this embodiment further includes a $CO_2$ recovery rate varying unit 19, a variation range limiting unit 18, a $CO_2$ credit unit cost setting unit 20, a $CO_2$ reduction effect calculating unit 21, a fuel cost calculating unit 22, a power generation unit cost calculating unit 23, and a power generation unit cost verifying unit 24 in addition to all the components of the plant operation support system 1A of the first embodiment.

The $CO_2$ recovery rate varying unit 19 varies the $CO_2$ recovery rate [o/T] set by the condition setting unit 10 based on a result of verification by the power generation unit cost verifying unit 24. Specifically, the $CO_2$ recovery rate varying unit 19 varies the $CO_2$ recovery rate by, for example, the same ratio every time the result of verification by the power generation unit cost verifying unit 24 is obtained (performs for example a variation to sequentially increase the $CO_2$ recovery rate by 1% (%/T), a variation to sequentially decrease it by 1%, or the like). Setting of a value of the ratio of actual increase or decrease by the $CO_2$ recovery rate varying unit 19 in this manner can be specified appropriately by, for example, an input operation from the input operation unit 5.

The variation range limiting unit 18 limits (sets) the variation range of the $CO_2$ recovery rate to be varied by the $CO_2$ recovery rate varying unit 19, and sets an upper limit and a lower limit of the variation range of the $CO_2$ recovery rate. On the variation range limited by this variation range limiting unit 18, for example, a content specified by the operator via the input operation unit 5 illustrated in FIG. 1 is reflected (for example, an initial $CO_2$ recovery rate 50 [%/T] or the like is taken as a center value, and this $CO_2$ recovery rate is varied in the range of 30 to 80 [%/T]).

The credit unit cost setting unit 20 sets a credit price of $CO_2$, that is, $CO_2$ credit unit cost (such as 3000 yen for example) per unit mass such as 1 t (ton) for example, assuming the Emissions Trading (ET) of the Kyoto mechanism which is a system of trading $CO_2$ credits, or the like.

Here, as the emission trading, for example, the following trading system is assumed for example. Specifically, a predetermined $CO_2$ emission is set to, for example, a business owner or the like who emits $CO_2$. A business owner or the like who has the actual emission of $CO_2$ less than the emission limit can sell the difference as an emission right ($CO_2$ credit). On the other hand, a business owner or the like whose actual emission of $CO_2$ exceeded the emission limit can buy an emission right for the excess emission to satisfy the limit of the emission.

Note that the plant operation support system 1B of this embodiment has the function of the predicting unit 32 provided in the plant operation support system 1A of the first embodiment. The total output calculating unit 14 performs convergence calculation similarly to the first embodiment, so as to obtain the generator total output amount AG to be outputted from the thermal power generation facility including the steam turbine generator.

The $CO_2$ reduction effect calculating unit 21 integrates, after reflecting the $CO_2$ recovery rate varied by the $CO_2$ recovery rate varying unit 19, the $CO_2$ recovery amount calculated in the $CO_2$ recovery amount calculating unit 16 and the $CO_2$ credit unit cost set in the credit unit cost setting unit 20, so as to calculate the $CO_2$ credit price corresponding to the $CO_2$ reduction amount. On the other hand, the fuel cost calculating unit 22 integrates the fuel consumption amount by type calculated in the fuel consumption calculating unit 17 and the unit cost of the fuel used for operating the boiler of the thermal power generation facility illustrated in FIG. 3 to calculate the fuel cost.

The power generation unit cost calculating unit 23 subtracts the $CO_2$ credit price calculated by the $CO_2$ reduction effect calculating unit 21 from the fuel cost calculated by the fuel cost calculating unit 22, to thereby calculate a power generation unit cost which is the total cost when the generator total output amount AG is obtained. That is, the power generation unit cost calculating unit 23 functions as a power generation cost calculating unit, and calculates a power generation cost in which the fuel cost and the income corresponding to the reduction amount of $CO_2$ are integrated based on the $CO_2$ recovery amount and the fuel consumption amount which are predicted by the predicting unit 32 described in the first embodiment.

The power generation unit cost verifying unit 24 verifies the power generation cost calculated by the power generation unit cost calculating unit 23. Here, as illustrated in FIG. 10, when the power generation cost is not minimum as a result of verification by the power generation unit cost verifying unit 24 (when the result of verification is NO), the $CO_2$ recovery rate varying unit 19 sequentially increases or decreases the $CO_2$ recovery rate of the initial value by a ratio which is specified in advance. Thus, the power generation unit cost verifying unit 24 obtains the $CO_2$ recovery rate when the power generation cost is minimum (when the result of verification is YES). That is, the power generation unit cost verifying unit 24 and the $CO_2$ recovery rate varying unit 19 which operate in cooperation with each other function as a recovery rate detecting unit detecting the $CO_2$ recovery rate as a condition that minimizes the power generation unit cost (power generation cost) calculated in the power generation unit cost calculating unit 23 by adding a variation to the $CO_2$ recovery rate set in the condition setting unit 10.

More specifically, first, the power generation unit cost verifying unit 24 compares the power generation unit cost calculated by applying the initial $CO_2$ recovery rate before the rate is changed with the power generation unit cost calculated by using the $CO_2$ recovery rate obtained by decreasing the initial $CO_2$ recovery rate by −1% for example. When the power generation unit cost applying the $CO_2$ recovery rate obtained by decreasing −1% from the initial value is smaller than the power generation cost applying the $CO_2$ recovery rate of the initial value as a result of comparison, the $CO_2$ recovery rate varying unit 19 decreases the $CO_2$ recovery rate from the initial value by −2%. The power generation unit cost calculating unit 23 uses this $CO_2$ recovery rate decreased by −2% to re-calculate the power generation cost. The power generation unit cost verifying unit 24 compares the power generation unit cost obtained by the aforementioned $CO_2$ recovery rate decreased by −1% with the power generation unit cost obtained by the $CO_2$ recovery rate decreased by −2%.

When the power generation unit cost applying the $CO_2$ recovery rate obtained by decreasing −1% from the initial value is larger than the power generation cost applying the $CO_2$ recovery rate of the initial value as a result of comparison by the power generation unit cost verifying unit 24, the $CO_2$ recovery rate varying unit 19 increases the $CO_2$ recovery rate from the initial value by +1%. The power generation unit cost calculating unit 23 uses this $CO_2$ recovery rate increased by +1% to calculate the power generation cost.

Thus, the $CO_2$ recovery rate varying unit 19 decreases the $CO_2$ recovery rate of the initial value by the ratio of, for example, −1%, −2%, . . . −n % or increases it by the ratio of, for example, +1%, +2%, . . . +n % which are specified in advance according to the result of comparison of the power generation unit cost by the power generation unit cost verifying unit 24. On the other hand, the power generation unit cost calculating unit 23 sequentially calculates the power generation unit cost by applying the $CO_2$ recovery rate which is increased or decreased in this manner. Here, the $CO_2$ recovery rate varying unit 19 changes the variation range "−n % to +n %" of the $CO_2$ recovery rate within the range limited (set) by the variation range limiting unit 18.

The power generation unit cost verifying unit 24 obtains (predicts) the $CO_2$ recovery rate with which the power generation cost becomes minimum by such repetitive calculation and comparison. Moreover, the output unit 25 displays the obtained minimum power generation unit cost and the $CO_2$ recovery rate, the fuel consumption amount, and the $CO_2$ recovery amount when the power generation unit cost becomes minimum via the display unit 2, in addition to the sending end power generation amount which is set in advance.

Therefore, with the plant operation support system 1B of this embodiment, it is possible to obtain the value of the $CO_2$ recovery rate with which the power generation unit cost becomes minimum under the condition that mainly the sending end power generation amount is fixedly specified. Thus, the thermal power generation plant can be operated efficiently by taking the power generation unit cost including the $CO_2$ reduction effect into consideration. Further, with this plant operation support system 1B, it is possible to obtain the $CO_2$ recovery rate with which the power generation cost becomes minimum within the range of variation specified by an operator or the like. Thus, efficient operation of the thermal power generation plant can be supported within a tolerable $CO_2$ reduction range.

Third Embodiment

A third embodiment will be described based on FIG. 11. Note that in FIG. 11, the same components as those illustrated in FIG. 2, FIG. 5, and FIG. 10 of the first and second embodiments are denoted by the same numerals, and description thereof is omitted.

Figure 11:
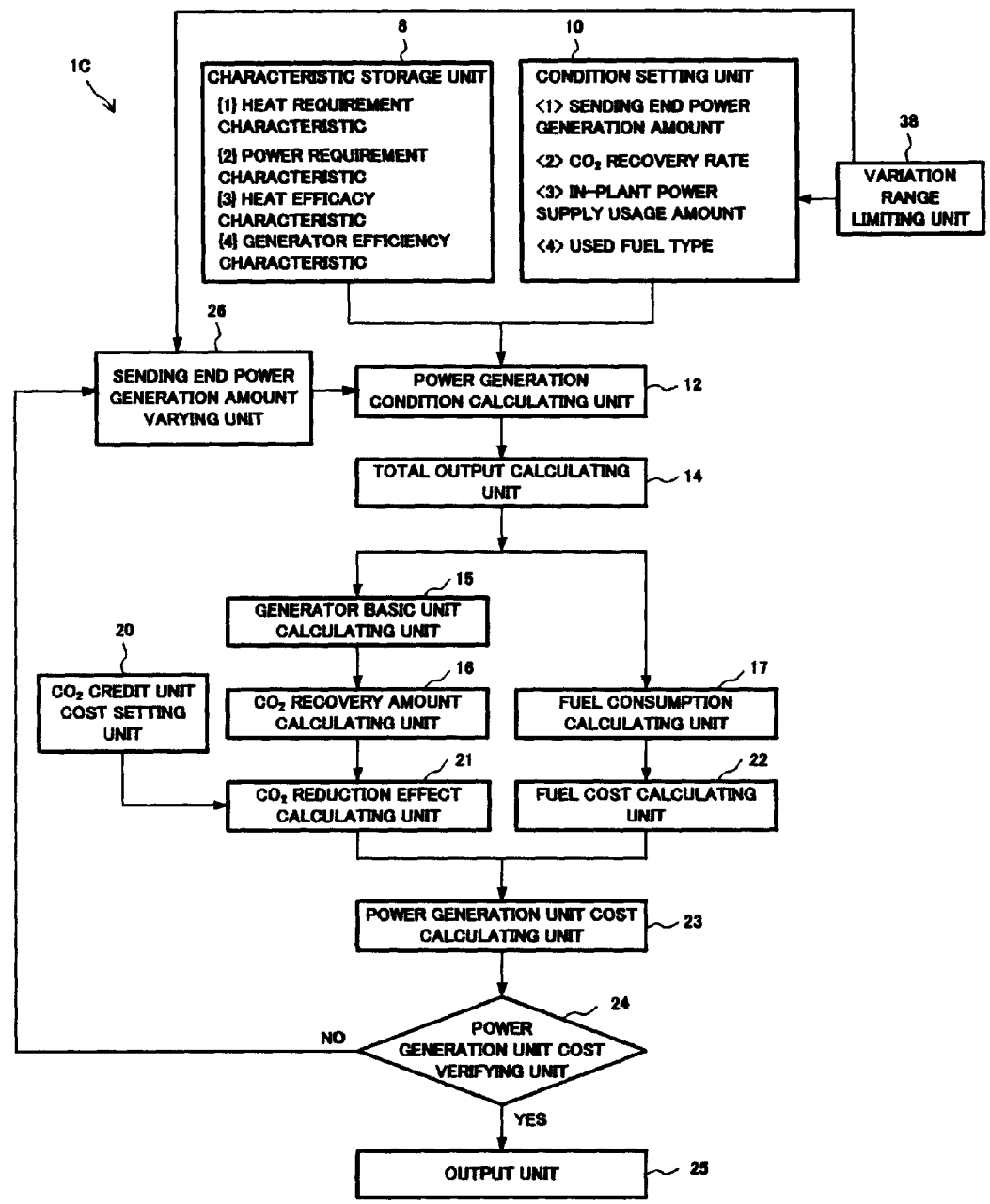
FIG. 11 is a functional block diagram illustrating a plant operation support system according to a third embodiment.

As illustrated in FIG. 11, a plant operation support system 1C of this embodiment includes a sending end power generation amount varying unit 26 instead of the $CO_2$ recovery rate varying unit 19 of the plant operation support system 1B of the second embodiment. Moreover, the plant operation support system 1C includes a (second) variation range limiting unit 38 instead of the variation range limiting unit 18.

The sending end power generation amount varying unit 26 varies the sending end power generation amount [GWh/T] set by the condition setting unit 10 based on a result of verification by the power generation unit cost verifying unit 24. Specifically, the sending end power generation amount varying unit 26 varies the sending end power generation amount by, for example, the same ratio every time the result of verification by the power generation unit cost verifying unit 24 is obtained (performs for example a variation to sequentially increase the initial sending end power generation amount by 1%, a variation to sequentially decrease it by 1%, or the like). Setting of a value of the ratio of actual increase or decrease by the sending end power generation amount varying unit 26 in this manner can be specified appropriately by, for example, an input operation from the input operation unit 5.

The variation range limiting unit 38 limits (sets) the variation range from a lower limit to an upper limit of the sending end power generation amount to be varied by the sending end power generation amount varying unit 26, so as to add a restriction to the variation amount to prevent an excessively large variation of the sending end power generation amount. On the variation range set by this variation range limiting unit 38, for example, a content inputted by the operator via the input operation unit 5 illustrated in FIG. 1 is reflected (for example, "85 to 115 [%]" when the sending end power generation amount set and inputted as an initial value is 100%).

Note that the plant operation support system 1C of this embodiment also has the function of the predicting unit 32 provided in the plant operation support system 1A of the first embodiment. The total output calculating unit 14 performs convergence calculation similarly to the first embodiment, so as to obtain the generator total output amount AG.

The power generation unit cost verifying unit 24 verifies the power generation unit cost calculated by the power generation unit cost calculating unit 23. Here, as illustrated in FIG. 11, when the power generation unit cost is not minimum as a result of verification by the power generation unit cost verifying unit 24 (result of verification is NO), the sending end power generation amount varying unit 26 sequentially increases or decreases the sending end power generation amount of the initial value by a ratio specified in advance. Thus, the power generation unit cost verifying unit 24 obtains the sending end power generation amount when the power generation unit cost is minimum (result of verification is YES). That is, the power generation unit cost verifying unit 24 and the sending end power generation amount varying unit 26 which operate in cooperation with each other function as a power supply amount detecting unit detecting the sending end power generation amount (power supply amount) as a condition that minimizes the power generation unit cost (power generation cost) calculated in the power generation unit cost calculating unit 23 by adding a variation to the sending end power generation amount set in the condition setting unit 10.

Describing in more detail, similarly to the $CO_2$ recovery rate varying unit 19 described in the second embodiment, the power generation unit cost verifying unit 24 decreases the sending end power generation amount of the initial value by the ratio of, for example, −1%, −2%, . . . −n % or increases it by the ratio of, for example, +1%, +2%, . . . +n % which are specified in advance according to the result of comparison of the power generation unit cost by the power generation unit cost verifying unit 24. On the other hand, the power generation unit cost calculating unit 23 sequentially calculates the power generation unit cost by applying the sending end power generation amount which is increased or decreased in this manner. Here, the sending end power generation amount varying unit 26 changes the variation range "−n % to +n %" of the sending end power generation amount within the range limited (set) by the variation range limiting unit 38.

The power generation unit cost verifying unit 24 obtains (predicts) the sending end power generation amount with which the power generation cost becomes minimum by such repetitive calculation and comparison. Moreover, the output unit 25 displays the obtained minimum power generation unit cost and the sending end power generation amount, the fuel consumption amount, and the $CO_2$ recovery amount when the power generation unit cost becomes minimum via the display unit 2, in addition to the sending end power generation amount which is set in advance.

Therefore, with the plant operation support system 1C of this embodiment, it is possible to obtain the value of the sending end power generation amount with which the power generation unit cost becomes minimum under the condition that mainly the $CO_2$ recovery rate is fixedly specified. Thus, the thermal power generation plant can be operated efficiently by taking the power generation unit cost including the $CO_2$ reduction effect and a desired sending end power generation amount into consideration. Moreover, with this plant operation support system 10, since it is possible to specify a condition range for increasing or decreasing the sending end power generation unit cost, it is possible to support efficient operation of the thermal power generation plant at lowest power generation cost while, for example, a minimum required value of the sending end power generation amount or the like is secured.

Fourth Embodiment

A fourth embodiment will be described based on FIG. 12. Note that in FIG. 12, the same components as those illustrated in FIG. 2, FIG. 5, FIG. 10, and FIG. 11 of the first to third embodiments are denoted by the same numerals, and description thereof is omitted.

Figure 12:
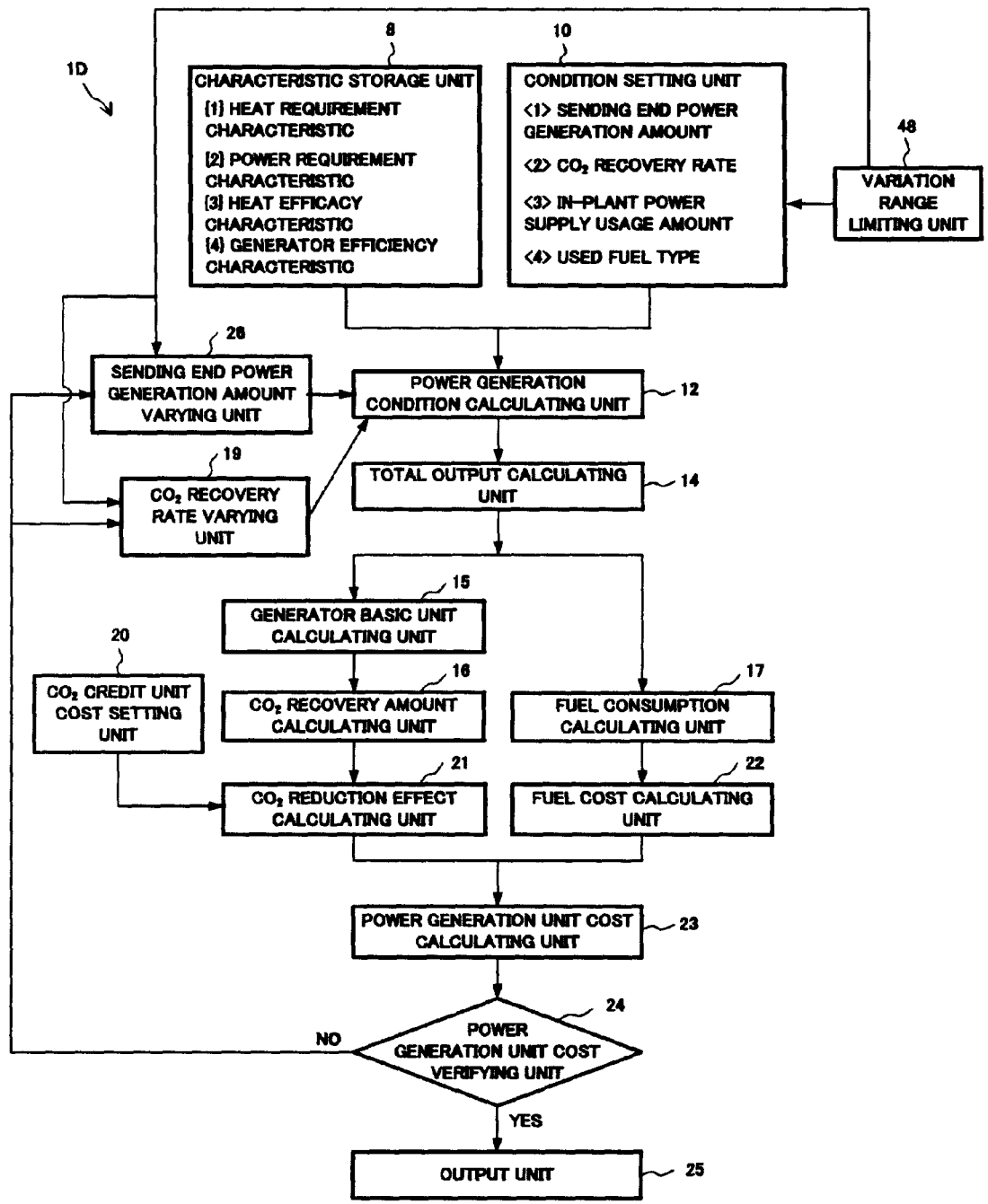
FIG. 12 is a functional block diagram illustrating a plant operation support system according to a fourth embodiment.

As illustrated in FIG. 12, a plant operation support system 1D of this embodiment includes a $CO_2$ recovery rate varying unit 19 of the second embodiment in addition to the structure of the plant operation support system 1C of the third embodiment including the sending end power generation amount varying unit 26. Moreover, the plant operation support system 1D includes a (third) variation range limiting unit 48 instead of the variation range limiting unit 38.

The $CO_2$ recovery rate varying unit 19 and the sending end power generation amount varying unit 26 separately vary the $CO_2$ recovery rate and the sending end power generation amount set in the condition setting unit 10 based on a result of verification by the power generation unit cost verifying unit 24. Specifically, the $CO_2$ recovery rate varying unit 19 and the sending end power generation amount varying unit 26 vary the $CO_2$ recovery rate and the sending end power generation amount respectively by, for example, the same ratio (for example, increases separately by 1% or decreases separately by 1%) every time the result of verification by the power generation unit cost verifying unit 24 is obtained. Setting of values of the ratios of variations by the $CO_2$ recovery rate varying unit 19 and the sending end power generation amount varying unit 26 can be specified by an input operation from the input operation unit 5 illustrated in FIG. 1.

The variation range limiting unit 48 limits (sets) the variation ranges of the $CO_2$ recovery rate and the sending end power generation amount which are varied by the $CO_2$ recovery rate varying unit 19 and the sending end power generation amount varying unit 26 respectively, and sets upper limits and lower limits of the respective variation ranges. On the variation ranges limited (set) by this variation range limiting unit 48, a content inputted by the operator via the input operation unit 5 illustrated in FIG. 1 is reflected.

Further, the plant operation support system 1D of this embodiment also has the function of the predicting unit 32 provided in the plant operation support system 1A of the first embodiment. The total output calculating unit 14 performs convergence calculation similarly to the first embodiment, so as to obtain the generator total output amount AG.

The power generation unit cost verifying unit 24 verifies the power generation unit cost calculated by the power generation unit cost calculating unit 23. Here, as illustrated in FIG. 11, when the power generation unit cost is not minimum as a result of verification by the power generation unit cost verifying unit 24 (result of verification is NO), the $CO_2$ recovery rate varying unit 19 and the sending end power generation amount varying unit 26 sequentially increase or decrease the $CO_2$ recovery rate of the initial value or the sending end power generation amount of the initial value by a ratio specified in advance. Thus, the power generation unit cost verifying unit 24 obtains a combination of the $CO_2$ recovery rate and the sending end power generation amount when the power generation unit cost is minimum (result of verification is YES). That is, the power generation unit cost verifying unit 24, the $CO_2$ recovery rate varying unit 19, and the sending end power generation amount varying unit 26 which operate in cooperation with each other function as a combination detecting unit detecting a combination of the carbon dioxide recovery rate and the sending end power generation amount as a condition that minimizes the power generation unit cost (power generation cost) calculated in the power generation unit cost calculating unit 23 by adding a variation to each of the carbon dioxide recovery rate and the sending end power generation amount (power supply amount) set in the condition setting unit 10.

More specifically, similarly to the $CO_2$ recovery rate varying unit 19 described in the second embodiment, the power generation unit cost verifying unit 24 decreases the $CO_2$ recovery rate of the initial value or the sending end power generation amount of the initial value separately by the ratio of, for example, −1%, −2%, . . . −n % or increases them separately by the ratio of, for example, +1%, +2%, . . . +n % which are specified in advance according to the result of comparison of the power generation unit cost by the power generation unit cost verifying unit 24. On the other hand, the power generation unit cost calculating unit 23 sequentially calculates the power generation unit cost by applying the $CO_2$ recovery rate and the sending end power generation amount which are increased or decreased in this manner. Here, the $CO_2$ recovery rate varying unit 19 and the sending end power generation amount varying unit 26 change the variation range "−n % to +n %" of the $CO_2$ recovery rate and the sending end power generation amount within the range set by the variation range limiting unit 48.

The power generation unit cost verifying unit 24 obtains (predicts) the $CO_2$ recovery rate and the sending end power generation amount with which the power generation cost becomes minimum by such repetitive calculation and comparison. Moreover, the output unit 25 displays the obtained minimum power generation unit cost and the $CO_2$ recovery rate, the sending end power generation amount, the fuel consumption amount, and the $CO_2$ recovery amount when the power generation unit cost becomes minimum via the display unit 2.

Thus, in the plant operation support system 1D of this embodiment, the $CO_2$ recovery rate and the sending end power generation amount with which the power generation unit cost becomes minimum are predicted while varying respective values of the $CO_2$ recovery rate and the sending end power generation amount within the ranges set (limited) in advance. As a result, the thermal power generation plant can be operated efficiently by reflecting this prediction result with which the power generation unit cost becomes minimum.

Fifth Embodiment

Next, a fifth embodiment will be described based on FIG. 13. Note that in FIG. 13, the same components as those in FIG. 2, FIG. 5, and FIG. 10 to FIG. 12 of the first to fourth embodiments are denoted by the same numerals, and description thereof is omitted.

Figure 13:
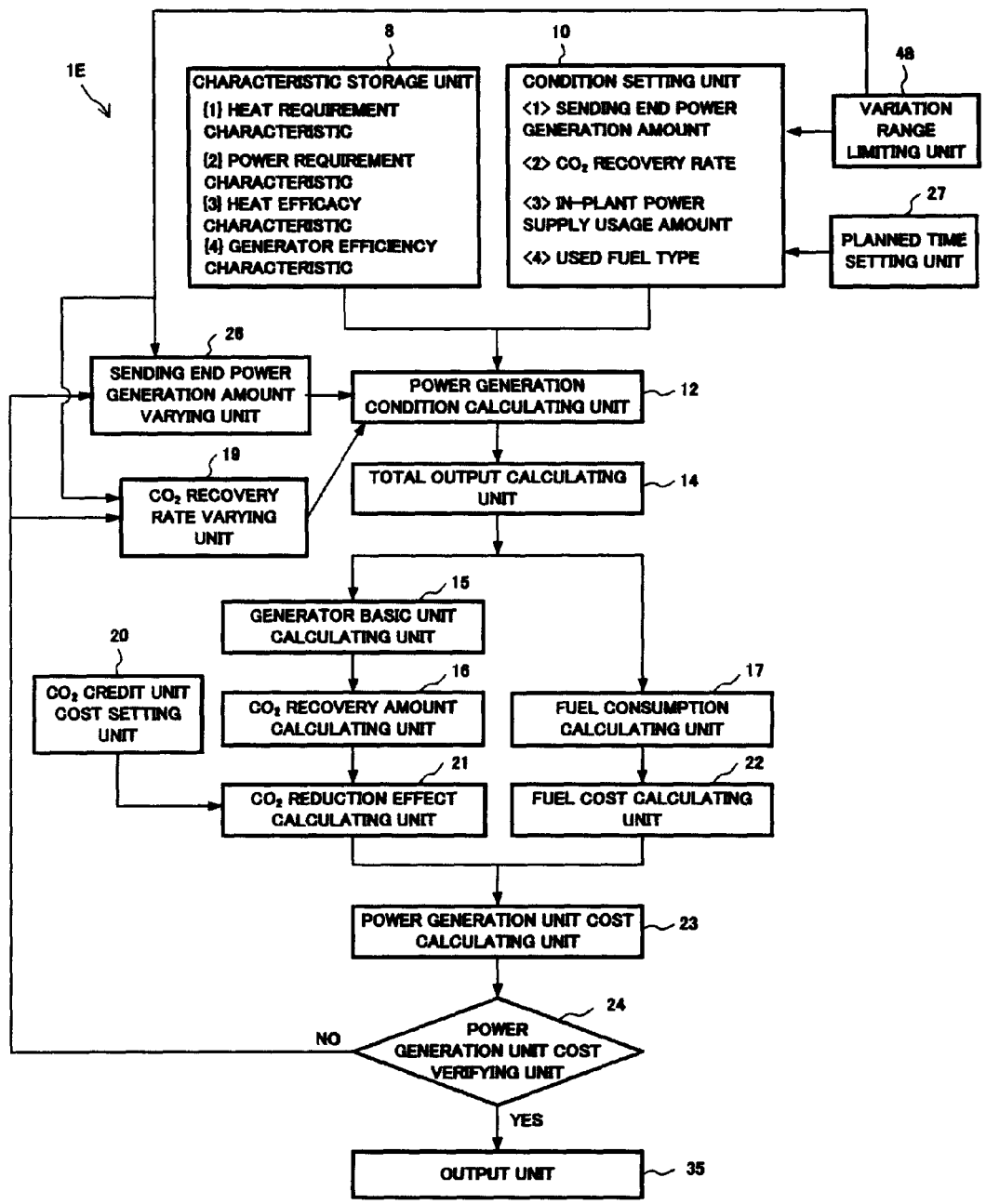
FIG. 13 is a functional block diagram illustrating a plant operation support system according to a fifth embodiment.

As illustrated in FIG. 13, a plant operation support system 1E of this embodiment further has a planned time setting unit 27 in addition to the structure of the plant operation support system 1D of the fourth embodiment, and includes an output unit 35 instead of the output unit 25.

The planned time setting unit 27 sets an arbitrary date and time as a planned time for assigning a time element in an operating (power generation) plan of the plant. Moreover, the planned time setting unit 27 can set a plurality of planned times of different dates and times. Further, the planned time set by the planned time setting unit 27 can be specified arbitrarily by an input operation by the operator or the like from the input operation unit 5 illustrated in FIG. 1.

Here, the planned time set by the planned time setting unit 27 is related to the sending end power generation amount, the $CO_2$ recovery rate, and so on set in the condition setting unit 10. Moreover, this set planned time is also related to the minimum power generation unit cost calculated as a prediction result and the $CO_2$ recovery rate, the sending end power generation amount, the fuel consumption amount, and the $CO_2$ recovery amount when the power generation unit cost is minimum. In this case, a unit period T included in each unit of the sending end power generation amount [GWh/T], the $CO_2$ recovery amount [%/T], and so on described in the first embodiment is set as one minute so as to correspond to the date and time of the planned time.

The output unit 35 displays on the display unit 2 information in tabular form for example in which the minimum power generation unit cost, the $CO_2$ recovery rate, the sending end power generation amount, the fuel consumption amount, and the $CO_2$ recovery amount when the power generation unit cost becomes minimum, which are predicted similarly to the fourth embodiment, and the planned time set by the planned time setting unit 27 correspond to each other.

Therefore, in the plant operation support system 1E of this embodiment, the planned time is further added and displayed with respective calculated predicted values of the $CO_2$ recovery rate, the sending end power generation amount, and so on when, for example, the power generation unit cost becomes minimum. Accordingly, the contents of this display can be utilized effectively as direct operating schedule data of the thermal power generation plant.

Sixth Embodiment

A sixth embodiment will be described based on FIG. 14. Note that in FIG. 14, the same components as those in FIG. 2, FIG. 5, and FIG. 10 to FIG. 13 of the first to fifth embodiments are denoted by the same numerals, and description thereof is omitted.

Figure 14:
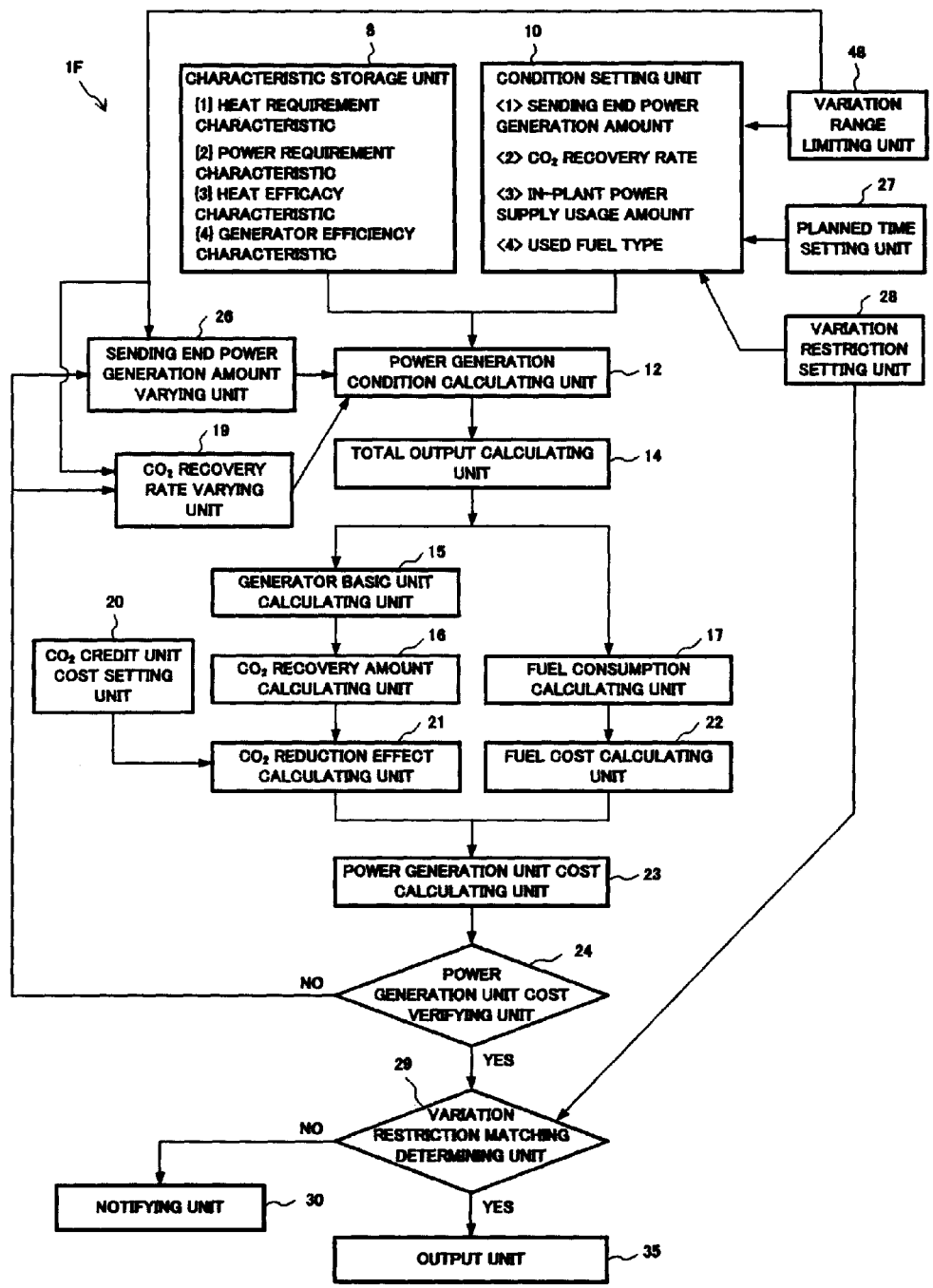
FIG. 14 is a functional block diagram illustrating a plant operation support system according to a sixth embodiment.

As illustrated in FIG. 14, a plant operation support system 1F of this embodiment further has a variation restriction setting unit 28, a variation restriction matching determining unit 29, and a notifying unit 30 in addition to the structure of the plant operation support system 1E of the fifth embodiment.

The variation restriction setting unit 28 sets variation restrictions for the $CO_2$ recovery rate [%/T] and the sending end power generation amount [GWh/T] to be varied by the $CO_2$ recovery rate varying unit 19 and the sending end power generation amount varying unit 26. A variation restriction is for determining a ratio of variation per unit period such as 1% per minute for example, that is, a variation rate as a threshold, and for restricting a variation when it exceeds the determined variation rate. The variation restriction can be specified arbitrarily by an input operation by the operator from the input operation unit 5 illustrated in FIG. 1.

The variation restriction matching determining unit 29 functions as a set condition obtaining unit and a variation rate calculating unit, and obtains the $CO_2$ recovery rate and the sending end power generation amount (power supply amount) with which the power generation cost becomes minimum for each planned time set by the planned time setting unit 27. Moreover, the variation restriction matching determining unit 29 calculates the variation rates of the obtained $CO_2$ recovery rate and the sending end power generation amount for each period between a preceding planned time and a succeeding planned time which are set by the planned time setting unit 27. Moreover, the variation restriction matching determining unit 29 determines whether or not respective values of the $CO_2$ recovery rate and the sending end power generation amount (with which the power generation cost becomes minimum) of the preceding planned time and the succeeding planned time have exceeded the variation restrictions.

That is, when the variation rates of the $CO_2$ recovery rate and the sending end power generation amount are excessively large, it is expected that the functions of the $CO_2$ recovery facility and the thermal power generation facility cannot follow the rapid changes of the $CO_2$ recovery amount and the power generation amount, and performance on the specification cannot be exhibited. Accordingly, to avoid this, determination of whether the variation restrictions are exceeded or not is necessary.

The notifying unit 30 displays on the display unit 2 illustrated in FIG. 1 variation rate error information when the variation restriction matching determining unit 29 determines that the values of the variation rates calculated for each period between planned times have exceeded the variation restrictions (thresholds)) (result of determination is NO). That is, the notifying unit 30 generates the variation rate error information as an alarm and notifies the operator or the like by the alarm. This variation rate error information includes at least the value of a variation rate determined to be exceeding the variation restriction, the preceding and succeeding planned times which are the source of calculating this variation rate, and an element name (names for the sending end power generation amount and/or the $CO_2$ recovery rate) for which exceeding of the variation rate is determined.

On the other hand, when the variation restriction matching determining unit 29 determines that the variation restrictions (thresholds) are not exceeded (result of determination is YES), the output unit 35 displays on the display unit 2 illustrated in FIG. 1 information in tabular form or the like in which the minimum power generation unit cost and the $CO_2$ recovery rate, the sending end power generation amount, the fuel consumption amount, and the $CO_2$ recovery amount when the power generation unit cost becomes minimum, which are predicted similarly to the fifth embodiment, and the respective planned times set by the planned time setting unit 27 correspond to each other.

In this manner, in the plant operation support system 1F of this embodiment, it is possible to output the variation rate error information as an alarm when the variation rates of the $CO_2$ recovery rate and the sending end power generation amount, which are predicted for each planned time considering the power generation unit cost, exceed the variation restrictions (tolerable ranges and so on for allowing the $CO_2$ recovery facility and the thermal power generation facility to perform, for example, rated operations on the specification). Therefore, the plant operation support system 1F enables effective operation of the thermal power generation plant in consideration of the operating performance and the power generation unit cost of the $CO_2$ recovery facility and the thermal power generation facility.

Seventh Embodiment

A seventh embodiment will be described based on FIG. 15. Note that in FIG. 15, the same components as those in FIG. 2, FIG. 5, and FIG. 10 to FIG. 14 of the first to sixth embodiments are denoted by the same numerals, and description thereof is omitted.

Figure 15:
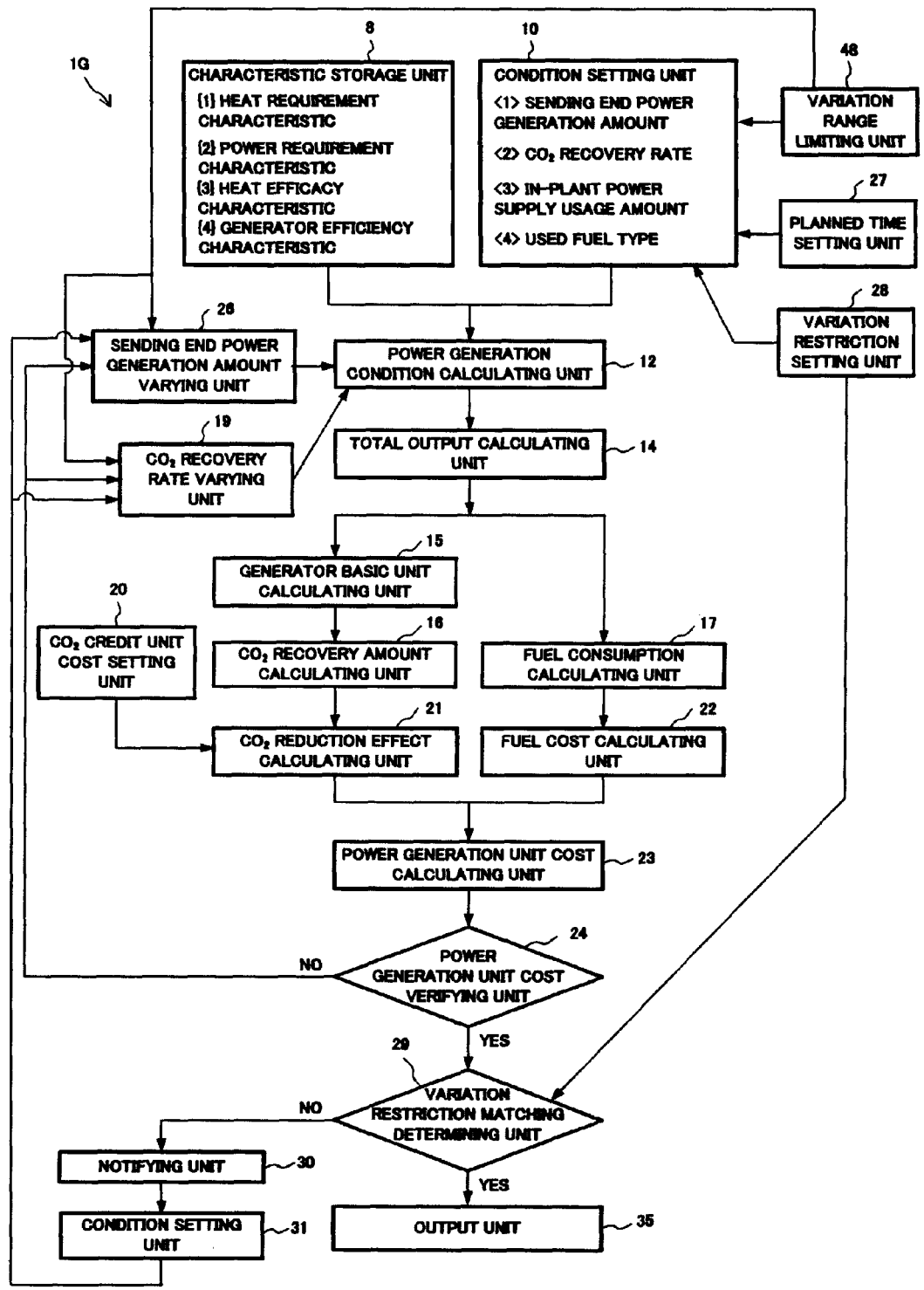
FIG. 15 is a functional block diagram illustrating a plant operation support system according to a seventh embodiment.

As illustrated in FIG. 15, a plant operation support system 1G of this embodiment further has a condition setting unit 31 in addition to all the components of the plant operation support system 1F of the sixth embodiment.

The condition setting unit 31 varies the value of the sending end power generation amount and/or the $CO_2$ recovery rate so that the variation rate of the sending end power generation amount or the $CO_2$ recovery rate becomes smaller than or equal to a threshold determined as a variation restriction under the condition that the variation restriction is not satisfied after the alarm is generated by the notifying unit 30 when the variation restriction matching determining unit 29 determines that the variation restriction is not satisfied (result of determination is NO). Here, the condition setting unit 31 cooperates with the power generation unit cost verifying unit 24 to repeat calculation and comparison similarly to the processing mainly described in the first to fourth embodiments. As a result, the condition setting unit 31 obtains (predicts) the $CO_2$ recovery rate, the sending end power generation amount, the fuel consumption amount, and the $CO_2$ recovery amount with which the power generation unit cost becomes minimum under the condition that the variation restriction is satisfied.

That is, when the value of the variation rate of the sending end power generation amount or the $CO_2$ recovery rate exceeds the threshold set as a variation restriction, such a condition setting unit 31 functions as a set condition re-obtaining unit which re-obtains the $CO_2$ recovery rate or the power supply amount with which the condition that the value of the variation rate is within the variation restriction (threshold) is satisfied and the power generation cost becomes minimum under this condition.

On the other hand, when the variation restriction matching determining unit 29 determines that the variation restriction is satisfied (result of determination is YES), the output unit 35 displays via the display unit 2 the minimum power generation unit cost satisfying the variation restriction and the $CO_2$ recovery rate, the sending end power generation amount, the fuel consumption amount, and the $CO_2$ recovery rate when the power generation unit cost becomes minimum while the variation restriction is satisfied.

Therefore, in the plant operation support system 1G of this embodiment, it is possible to comprehend in advance operating conditions which allow the $CO_2$ recovery facility and the thermal power generation facility to exhibit their original operating performance, and under which the power generation cost can further be suppressed. Thus, efficient operation of the thermal power generation plant can be realized.

Eighth Embodiment

An eighth embodiment will be described based on FIG. 16. Note that in FIG. 16, the same components as those in FIG. 2, FIG. 5, and FIG. 10 of the first and second embodiments are denoted by the same numerals, and description thereof is omitted.

Figure 16:
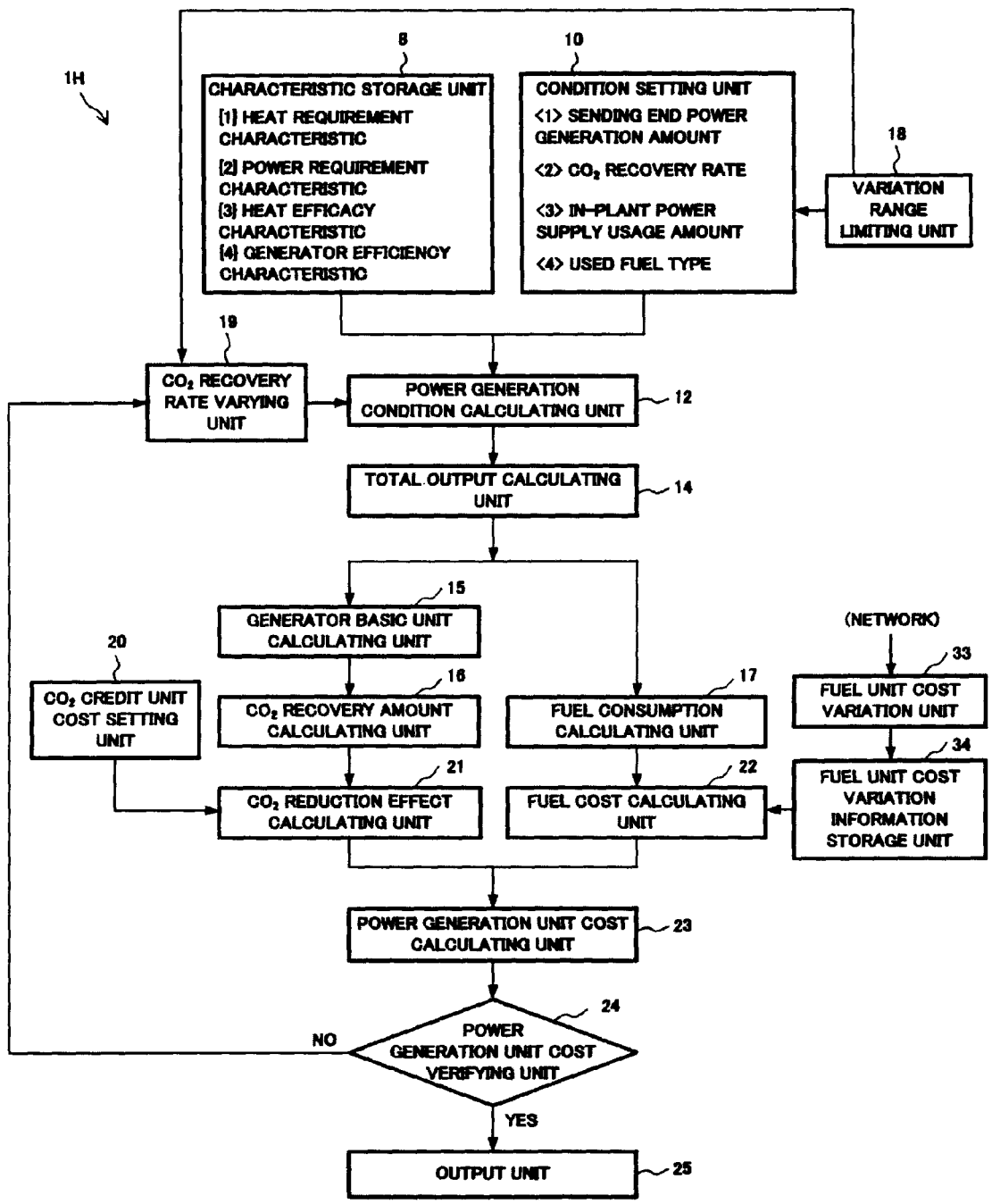
FIG. 16 is a functional block diagram illustrating a plant operation support system according to an eighth embodiment.

As illustrated in FIG. 16, a plant operation support system 1H of this embodiment includes a unit fuel cost variation unit 33 and a unit fuel cost variation information storage unit 34 in a front stage of the fuel cost calculating unit 22, in addition to the structure of the plant operation support system 1B of the second embodiment illustrated in FIG. 10.

The unit fuel cost variation unit 33 is connected to a network (the Internet, LAN (Local Area Network), or the like). The unit fuel cost variation unit 33 obtains variation information of fuel price via the network, adds time information to unit fuel cost information, and stores the information in the unit fuel cost variation information storage unit 34. It is possible to perform calculation in the fuel cost calculating unit 22 that reflects the latest unit fuel cost obtained by the unit fuel cost variation unit 33. The user of this system can use history information of unit fuel costs in the past to specify the unit fuel cost used in the fuel cost calculating unit 22. For example, it is possible to automatically select the largest value and the smallest value of the unit fuel cost in the past, and perform calculation (prediction) in the fuel cost calculating unit 22 under the two conditions of these largest value and smallest value.

Ninth Embodiment

A ninth embodiment will be described based on FIG. 17. Note that in FIG. 17, the same components as those in FIG. 2 and FIG. 5 of the first embodiment are denoted by the same numerals, and description thereof is omitted.

Figure 17:
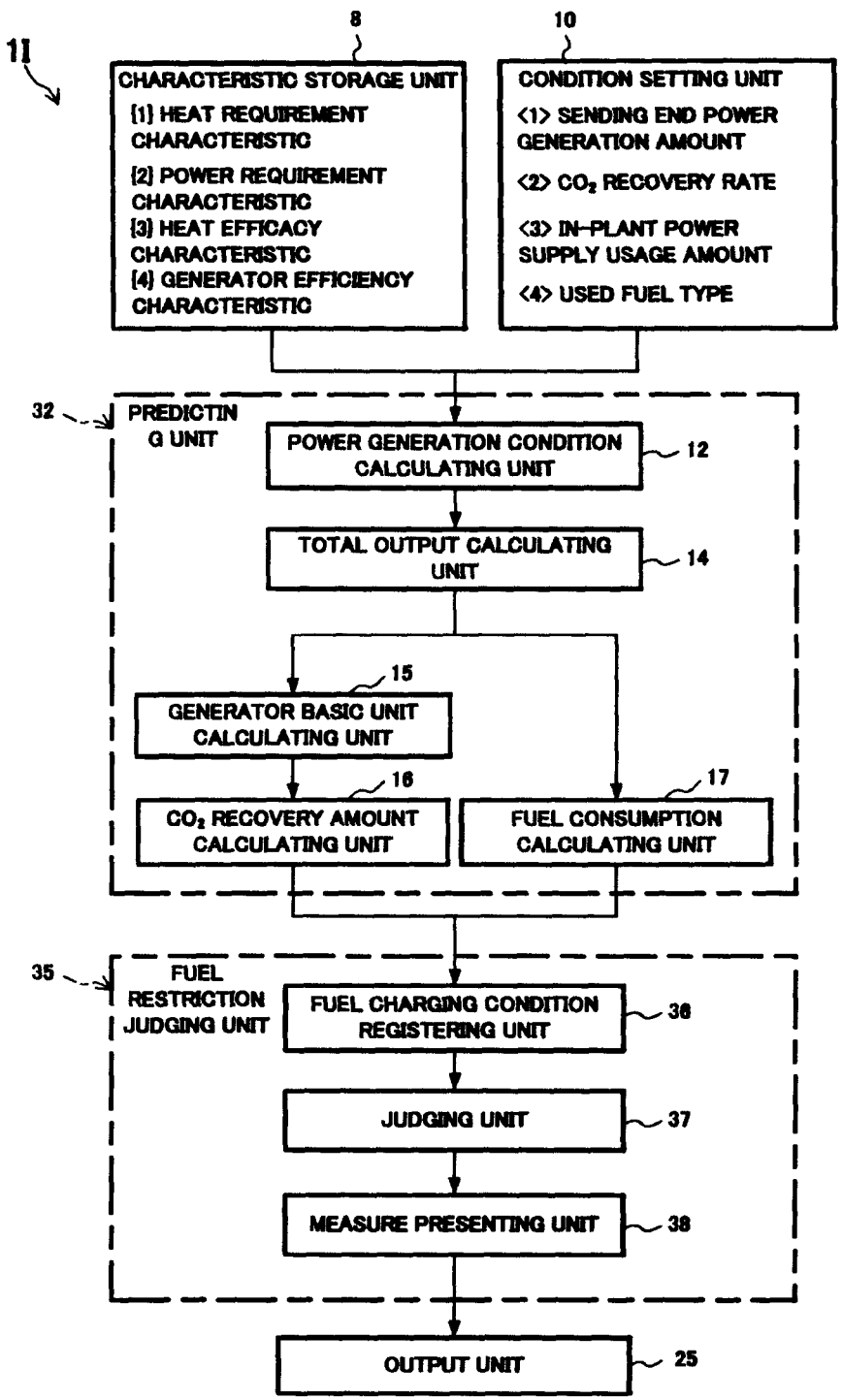
FIG. 17 is a functional block diagram illustrating a plant operation support system according to a ninth embodiment.

As illustrated in FIG. 17, a plant operation support system 1I of this embodiment has a fuel restriction judging unit 35 in a front stage of the output unit 25, in addition to the structure of the plant operation support system 1A of the first embodiment illustrated in FIG. 2. This fuel restriction judging unit 35 has a fuel charging condition registering unit 36, a judging unit 37, and a measure presenting unit 38.

In the fuel charging condition registering unit 36, fuel charging amounts (fuel charging condition information) according to the number of mills for fuel are registered. This fuel charging condition information is information such as "the maximum fuel charging amount is YY (kg/h) when the number of mills is XX" for example, and can be inputted manually or imported electronically from another system. The fuel charging condition information may be represented by a list in tabular form or a form such as a characteristic formula. The judging unit 37 judges whether it is possible to charge fuel corresponding to the fuel consumption amount predicted in the predicting unit 32, based on the fuel charging condition information and the current number of mills. When the judging unit 37 judges that the charging of fuel is not possible, the measure presenting unit 38 presents this measure. As the measure, for example, one or both of "decrease the power supply amount" and "increase the number of mills" are presented.

Note that the mill pulverize, for example, coal to produce powdered coal as fuel. When coal fire is used for example in the thermal power generation plant, the coal is pulverized by the mill to produce powdered coal which is jetted through a combustor (burner) to be burned, to thereby improve power generation efficiency.

Tenth Embodiment

A tenth embodiment will be described based on FIG. 18. Note that in FIG. 18, the same components as those in FIG. 2 and FIG. 5 of the first embodiment are denoted by the same numerals, and description thereof is omitted.

Figure 18:
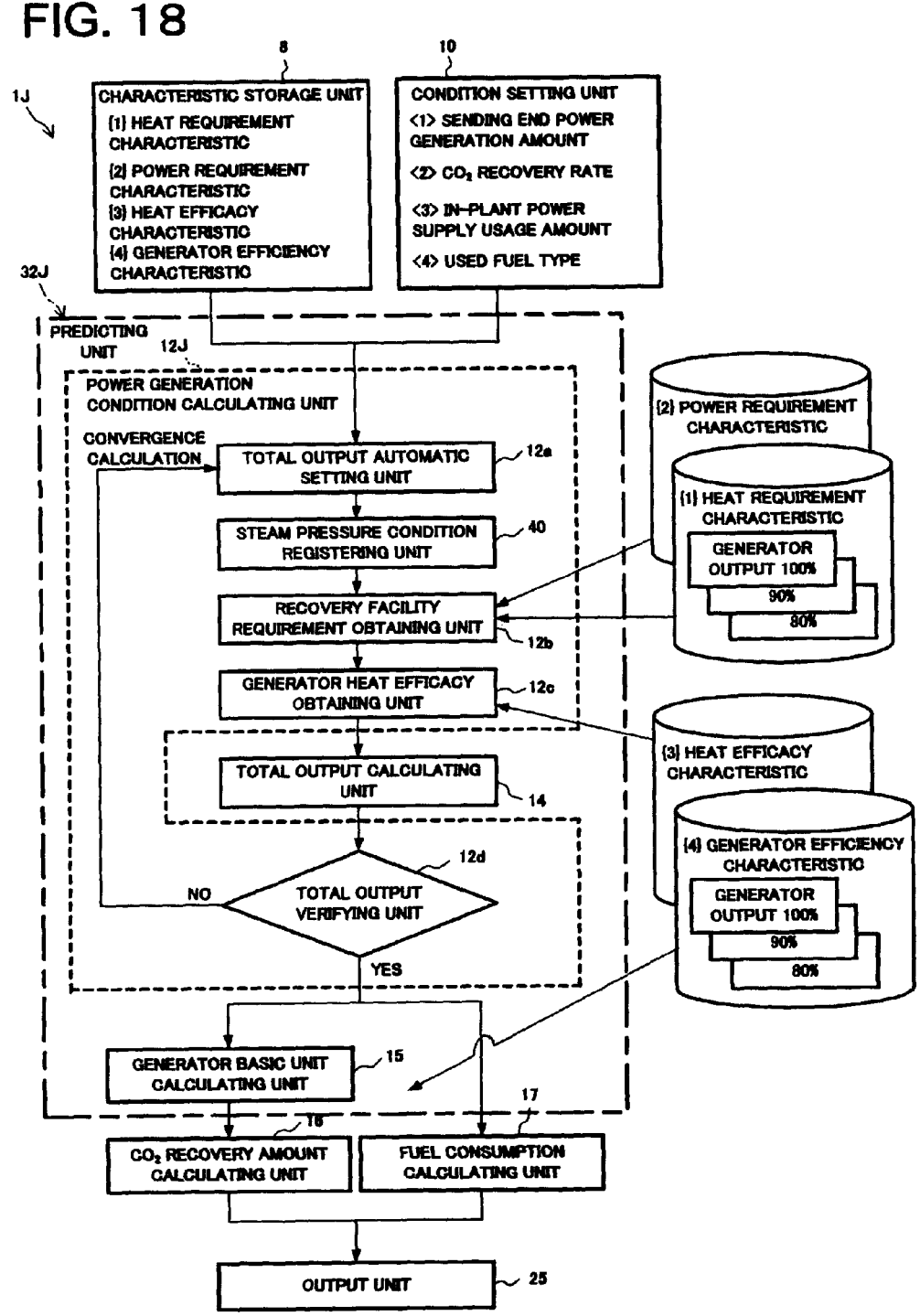
FIG. 18 is a functional block diagram illustrating a plant operation support system according to a tenth embodiment.

As illustrated in FIG. 18, in a plant operation support system 1J of this embodiment, a predicting unit 32J (power generation condition calculating unit 12J) has a steam pressure condition registering unit 40, in addition to the structure of the plant operation support system 1A of the first embodiment illustrated in FIG. 5. The steam pressure condition registering unit 40 is disposed between the total output automatic setting unit 12a and the recovery facility requirement obtaining unit 12b.

In the steam pressure condition registering unit 40, pluralities of {1} heat requirement characteristics, {2} power requirement characteristics, and {3} heat efficacy characteristics (first to third recovery capability characteristics) are stored for each steam pressure condition. That is, in this embodiment, the first to third recovery capability characteristics include dependency on steam pressure. In the first to third recovery capability characteristics illustrated in FIG. 6A, FIG. 6B, FIG. 7A, FIG. 7B, FIG. 8A, and FIG. 8B, dependency on generator output is considered. The first to third recovery capability characteristics further considering the steam pressure in addition to the generator output can improve reliability of prediction by the predicting unit 32J.

The steam pressure condition registering unit 40 registers a steam pressure condition corresponding to an output variation of the thermal power generation facility. The information of steam pressure condition is such that, for example, "set steam pressure is Y (MPa) when the output (power supply amount) range is "X1 to X2 (kWh)", and can be inputted manually or imported electronically from another system. The information of steam pressure condition may be represented by a list in tabular form or a form such as a characteristic formula.

The predicting unit 32J predicts a fuel consumption amount and a recovery amount of carbon dioxide based on the contents of setting in the condition setting unit 10, the first to third recovery capability characteristics registered in the steam pressure condition registering unit 40, and the steam pressure condition registered in the steam pressure condition registering unit 40.

Similarly to the already-described predicting unit 32, the predicting unit 32J (power generation condition calculating unit 12J and so on) operates as follows. The power generation condition calculating unit 12J determines the operating output of the steam turbine generator. Further, the recovery facility requirement obtaining unit 12b of the power generation condition calculating unit 12J obtains the necessary heat quantity corresponding to the <2> $CO_2$ recovery rate set in the condition setting unit 10 and the determined operating output while referring to the first recovery capability characteristic ({1} heat requirement characteristic). The generator heat efficacy obtaining unit 12c of the power generation condition calculating unit 12J obtains the necessary power amount corresponding to the determined operating output (generator output) of the steam turbine generator and the <2> $CO_2$ recovery rate set in the condition setting unit 10 while referring to the second recovery capability characteristic ({2} power requirement characteristic). The generator heat efficacy obtaining unit 12c of the power generation condition calculating unit 12J obtains the heat efficacy corresponding to the operating output (generator output) of the steam turbine generator and the necessary heat quantity determined as described above while referring to the third recovery capability characteristic ({3} heat efficacy characteristic).

Here, the power generation condition calculating unit 12J (steam pressure condition registering unit 40) obtains a steam pressure according to the set total output. Then, the recovery facility requirement obtaining unit 12b and the generator heat efficacy obtaining unit 12c can obtain the necessary heat quantity, the operating output (generator output), the necessary power amount, and the heat efficacy by using the information of steam pressure. That is, the fuel consumption amount and the recovery amount of carbon dioxide are predicted by using the steam pressure condition registered in the steam pressure condition registering unit 40.

Eleventh Embodiment

An eleventh embodiment will be described based on FIG. 19. Note that in FIG. 19, the same components as those in FIG. 2 and FIG. 5 of the first embodiment are denoted by the same numerals, and description thereof is omitted.

Figure 19:
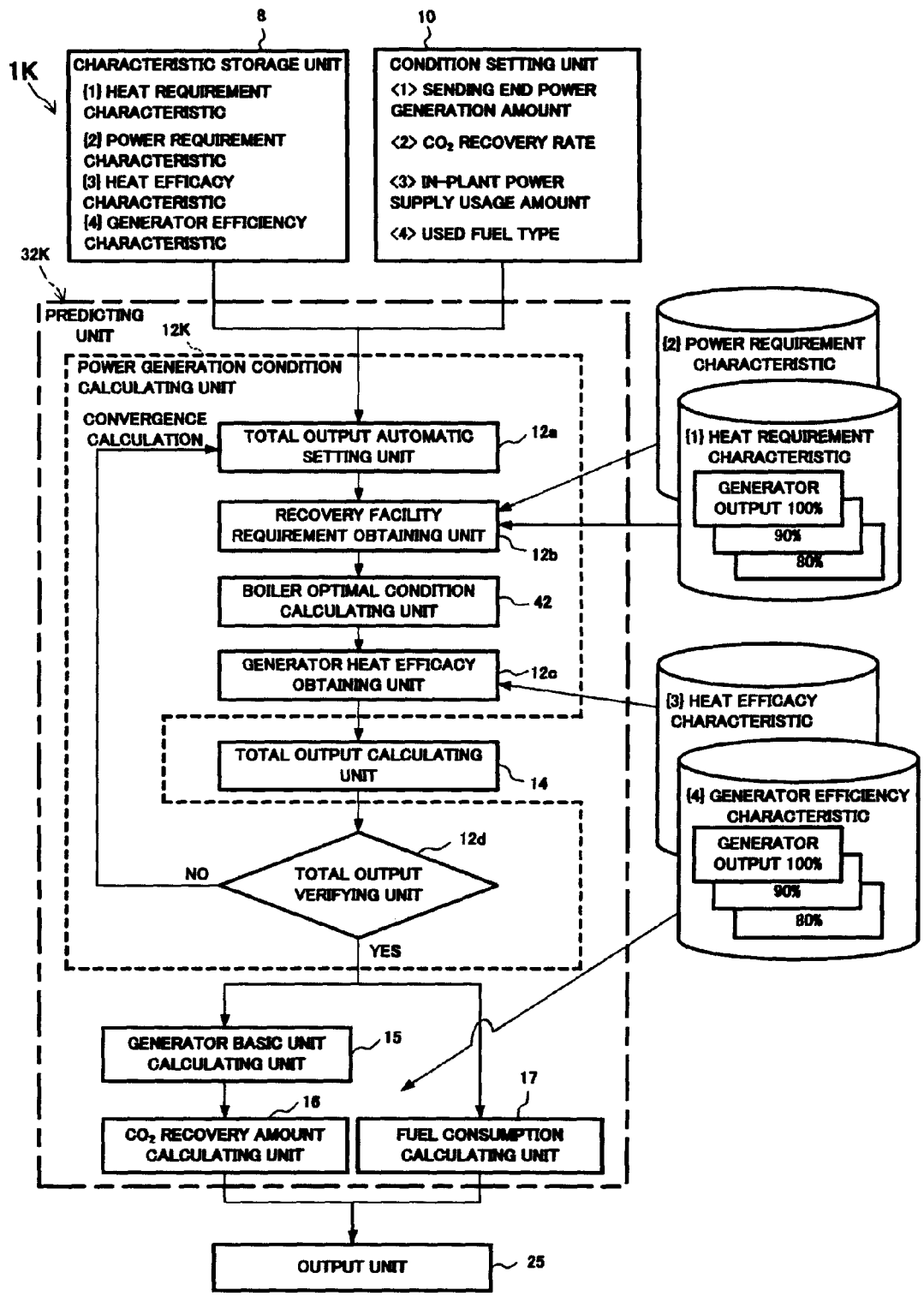
FIG. 19 is a functional block diagram illustrating a plant operation support system according to an eleventh embodiment.

As illustrated in FIG. 19, in a plant operation support system 1K of this embodiment, a predicting unit 32K (power generation condition calculating unit 12K) has a boiler optimal condition calculating unit 42, in addition to the structure of the plant operation support system 1A of the first embodiment illustrated in FIG. 5. The boiler optimal condition calculating unit 42 is disposed in a rear stage of the recovery facility requirement obtaining unit 12b.

As already described, the required heat quantity BS (value obtained by converting a necessary energy amount per unit period T for operating the $CO_2$ recovery facility into electricity) is obtained by the power generation condition calculating unit 12. The boiler optimal condition calculating unit 42 calculates optimal necessary amounts of fuel, water, and air in the boiler based on this required heat quantity BS. That is, in addition to the fuel, charging amounts of water and air can be calculated. The boiler optimal condition calculating unit 42 has a database representing, for example, the relation between the required heat quantity BS and the optimal amounts of fuel and so on in the boiler. The boiler optimal condition calculating unit 42 can obtain optimal amounts of fuel and so on in the boiler from the required heat quantity BS by using this database.

Twelfth Embodiment

A twelfth embodiment will be described based on FIG. 20. Note that in FIG. 20, the same components as those in FIG. 2 and FIG. 5 of the first embodiment are denoted by the same numerals, and description thereof is omitted.

Figure 20:
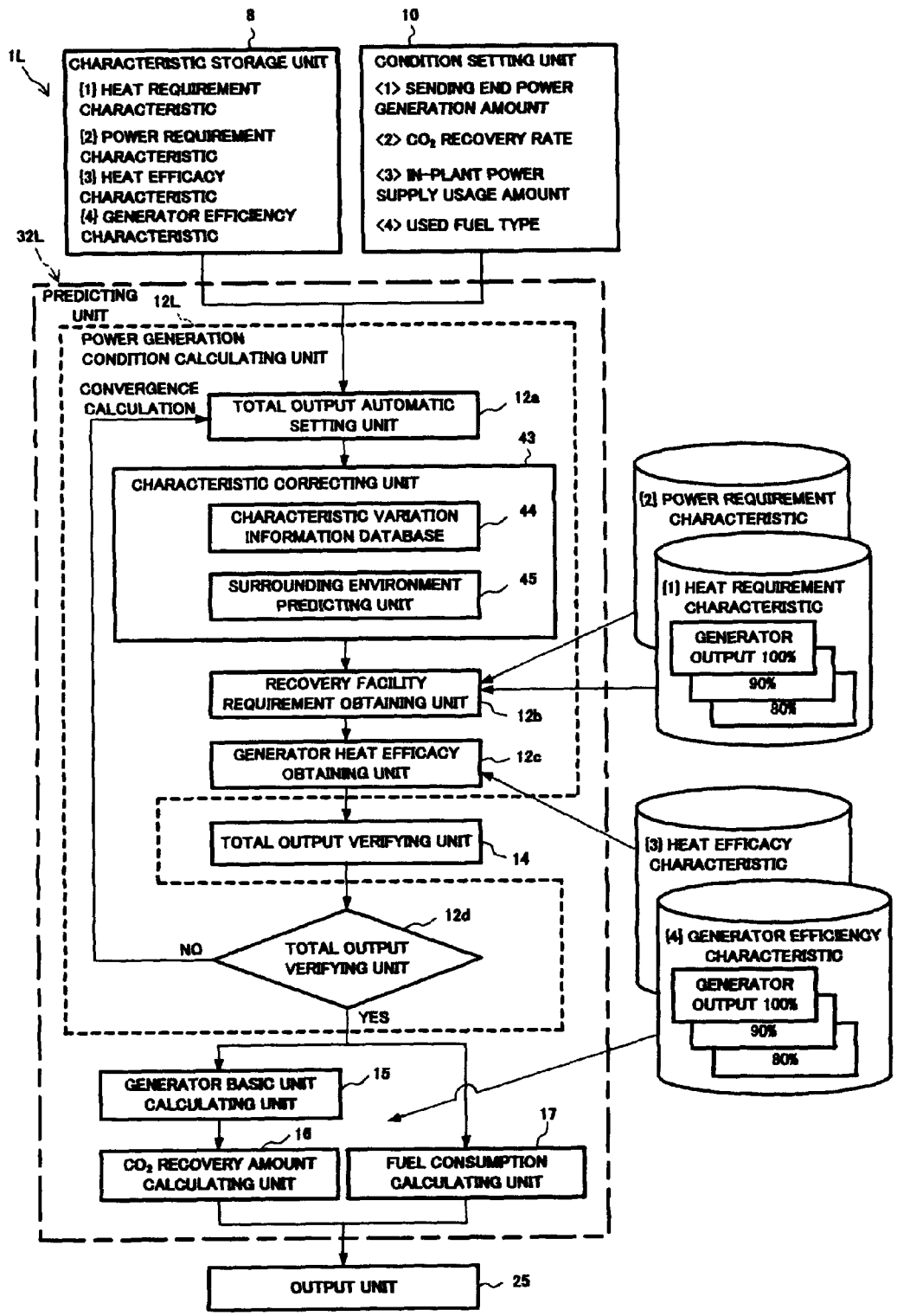
FIG. 20 is a functional block diagram illustrating a plant operation support system according to a twelfth embodiment.

As illustrated in FIG. 20, in a plant operation support system 1L of this embodiment, a predicting unit 32L (power generation condition calculating unit 12L) has a characteristic correcting unit 43, in addition to the structure of the plant operation support system 1A of the first embodiment illustrated in FIG. 5. The characteristic correcting unit 43 is disposed between the total output automatic setting unit 12a and the recovery facility requirement obtaining unit 12b, and includes a characteristic variation information database 44 and a surrounding environment predicting unit 45.

The characteristic variation information database 44 stores characteristic correction information representing the relation between the {1} heat requirement characteristic, the {2} power requirement characteristic, and the {3} heat efficacy characteristic (the first to the third recovery capability characteristics), and the {4} generator efficiency characteristic and the surrounding environment conditions (outside temperature, sea water temperature, temperature, and the like) of the plant. Specifically, the characteristic correction information represents how the {1} heat requirement characteristic and so on are changed by the outside temperature and so on in the plant. The characteristic correcting unit 43 corrects the {1} heat requirement characteristic, the {2} power requirement characteristic, and the {3} heat efficacy characteristic (the first to the third recovery capability characteristics), and the {4} generator efficiency characteristic by using the characteristic correction information. The {1} heat requirement characteristic and so on further considering the outside temperature and so on in addition to the generator output can improve reliability of prediction by the predicting unit 32.

In the surrounding environment predicting unit 45, surrounding environment conditions (outside temperature, sea-water temperature, temperature, and so on) when the power generation efficiency characteristic of the thermal power generation facility and the recovery capability characteristic of the carbon dioxide recovery facility are determined are registered as a database (past histories). The surrounding environment predicting unit 45 predicts the surrounding environment conditions at a time when calculation (prediction) is attempted by using this database. However, the surrounding environment conditions may be inputted in the surrounding environment predicting unit 45. In correction by the characteristic correcting unit 43, a prediction result or input result in the surrounding environment predicting unit 45 can be utilized.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the already-described embodiments, what is called a steam power generation facility equipped with a boiler and a steam turbine generator is exemplified as the thermal power generation facility installed in the thermal power generation plant. Instead of this, the present invention is applicable to a gas turbine power generation facility which generates power by rotating a gas turbine with combustion gas from burning kerosene, diesel oil, LNG, or the like, a combined cycle power generation facility which generates power by a combination of a gas turbine and a steam turbine, or the like.

What is claimed is:

1. A plant operation support system supporting operation of a plant including a thermal power generation facility and a carbon dioxide recovery facility which uses thermal energy and electrical power from the thermal power generation facility, the plant operation support system comprising:
   a condition setting unit setting a power supply amount to be supplied from the plant to an outside and a target recovery rate of carbon dioxide to be generated by the thermal power generation facility;
   a characteristic data storage unit storing characteristic data representing a capability of recovering carbon dioxide by the carbon dioxide recovery facility, the capability varying according to operating output of the thermal power generation facility; and
   a predicting unit predicting a fuel consumption amount in the thermal power generation facility and a recovery amount of carbon dioxide in the carbon dioxide recovery facility based on contents set by the condition setting unit and contents stored in the characteristic data storage unit,
   wherein the predicting unit sets an assumed value of a generator total output amount based on the set power supply amount, the generator total output amount representing a sum of an electric power amount generated by the thermal power generation facility and a thermal energy amount supplied from the thermal power generation facility to the carbon dioxide recovery facility, the predicting unit determines an operating output of the thermal power generation facility corresponding to the assumed value, the predicting unit obtains a necessary heat quantity and a necessary power amount corresponding to the determined operating output and the target recovery rate based on the characteristic data, the predicting unit obtains a heat efficacy based on the determined operating output and the characteristic data, the predicting unit calculates the generator total output amount based on the necessary heat quantity, the necessary power, and the heat efficacy, the predicting unit compares the calculated generator total output amount with the assumed value to verify the calculated generator total output, the predicting unit obtains the fuel consumption amount and the recovery amount of carbon dioxide based on the verified generator total output amount.

2. The plant operation support system according to claim 1, further comprising:
   a power generation cost calculating unit calculating a power generation cost integrating a fuel cost and an income corresponding to an amount of reduced carbon dioxide based on the carbon dioxide recovery amount and the fuel consumption amount which are predicted in the predicting unit; and
   a recovery rate detecting unit detecting a recovery rate of carbon dioxide as a condition that minimizes the power generation cost calculated in the power generation cost calculating unit by adding a variation to the recovery rate of carbon dioxide set by the condition setting unit.

3. The plant operation support system according to claim 2, further comprising a unit fuel cost variation unit obtaining unit fuel cost variation information representing a variation over time of a unit fuel cost,
   wherein the power generation cost calculating unit calculates the power generation cost based on the unit fuel cost variation information.

4. The plant operation support system according to claim 2, further comprising a variation range limiting unit limiting a variation range of the recovery rate of carbon dioxide by the recovery rate detecting unit.

5. The plant operation support system according to claim 1, further comprising:
   a power generation cost calculating unit calculating a power generation cost integrating a fuel cost and an income corresponding to an amount of reduced carbon dioxide based on the carbon dioxide recovery amount and the fuel consumption amount which are predicted in the predicting unit; and
   a power supply amount detecting unit detecting a recovery rate of carbon dioxide as a condition that minimizes the power generation cost calculated in the power generation cost calculating unit by adding a variation to the power supply amount set by the condition setting unit.

6. The plant operation support system according to claim 5, further comprising a second variation range limiting unit limiting a variation range of the power supply amount by the power supply amount detecting unit.

7. The plant operation support system according to claim 1, further comprising:
   a power generation cost calculating unit calculating a power generation cost integrating a fuel cost and an income corresponding to an amount of reduced carbon dioxide based on the carbon dioxide recovery amount and the fuel consumption amount which are predicted in the predicting unit;
   a combination detecting unit detecting a combination of a recovery rate of carbon dioxide and a power supply amount as a condition that minimizes the power generation cost calculated in the power generation cost calculating unit by adding a variation to the recovery rate of carbon dioxide and the power supply amount set by the condition setting unit; and
   a third variation range limiting unit limiting variation ranges of the recovery rate of carbon dioxide and the power supply amount by the combination detecting unit.

8. The plant operation support system according to claim 1, further comprising:
   a fuel charging condition registering unit registering fuel charging condition information representing a relation between a number of mills for fuel and a fuel charging amount;
   a judging unit judging whether charging of fuel corresponding to a fuel consumption amount predicted in the predicting unit is possible based on the fuel charging condition information; and
   a measure presenting unit presenting a measure when the judging unit judges that the charging of fuel is not possible.

9. The plant operation support system according to claim 2, further comprising:
   a planned time setting unit setting a planned time for assigning a time element in an operating plan of the plant; and
   an output unit outputting information in which the predicted fuel consumption amount and carbon dioxide recovery amount and at least one of the recovery rate of carbon dioxide and the power supply amount which minimize the power generation cost as a set condition are correlated with the planned time set in the planned time setting unit.

10. The plant operation support system according to claim 9,
    wherein the planned time setting unit sets a plurality of the planned times, the plant operation support system further comprising:
    a set condition obtaining unit obtaining the recovery rate of carbon dioxide or the power supply amount which minimize the power generation cost as a set condition for each planned time set by the planned time setting unit;
    a variation rate calculating unit calculating a variation rate of the obtained carbon dioxide recovery rate or power supply amount for each period between a preceding planned time and a succeeding planned time set by the planned time setting unit; and
    a notifying unit notifying that a value of the variation rate calculated for each period by the variation rate calculating unit exceeds a threshold.

11. The plant operation support system according to claim 10, further comprising a set condition re-obtaining unit re-obtaining the recovery rate of carbon dioxide or the power supply amount which satisfies a condition that the value of the variation rate is within the threshold and minimizes the power generation cost under this condition when the value of the variation rate has exceeded the threshold.

12. The plant operation support system according to claim 1,
wherein the characteristic data stored in the characteristic data storage unit includes at least one of:
a first recovery capability characteristic representing a correlation between the recovery rate of carbon dioxide by the carbon dioxide recovery facility and a power conversion amount of heat quantity per unit mass necessary for recovering a greenhouse effect gas including carbon dioxide in a manner corresponding to operating output of the thermal power generation facility;
a second recovery capability characteristic representing a correlation between the recovery rate of carbon dioxide by the carbon dioxide recovery facility and an electric power amount per unit mass necessary for recovering a greenhouse effect gas including carbon dioxide in a manner corresponding to operating output of the thermal power generation facility; and
a third recovery capability characteristic representing a correlation between efficiency of collecting thermal energy from the thermal power generation facility and a power conversion amount of heat quantity per unit mass necessary for recovering a greenhouse effect gas including carbon dioxide in a manner corresponding to operating output of the thermal power generation facility.

13. The plant operation support system according to claim 1, further comprising a steam pressure condition registering unit registering a steam pressure condition representing a relation between a power supply amount and a steam pressure,
wherein the predicting unit predicts the fuel consumption amount and the carbon dioxide recovery amount based on contents of setting in the condition setting unit, the characteristic data, and the steam condition pressure.

14. The plant operation support system according to claim 1,
wherein the predicting unit comprises:
a boiler optimal condition calculating unit calculating optimal necessary amount of fuel, water, and air in the boiler based on the necessary heat quantity.

15. The plant operation support system according to claim 1,
wherein the predicting unit corrects the characteristic data based on a surrounding environment status of the plant and predicts the fuel consumption amount and the carbon dioxide recovery amount based on the corrected characteristic data.

16. A non-transitory computer readable media storing a plant operation support program supporting operation of a plant including a thermal power generation facility and a carbon dioxide recovery facility which uses thermal energy and electrical power from the thermal power generation facility, the plant operation support program causing a computer to function as:
a condition setting unit setting a power supply amount to be supplied from the plant to an outside and a target recovery rate of carbon dioxide to be generated by the thermal power generation facility;
a characteristic data storage unit storing characteristic data representing a capability of recovering carbon dioxide by the carbon dioxide recovery facility, the capability varying according to operating output of the thermal power generation facility; and
a predicting unit predicting a fuel consumption amount in the thermal power generation facility and a recovery amount of carbon dioxide in the carbon dioxide recovery facility based on contents set by the condition setting unit and contents stored in the characteristic data storage unit,
wherein the predicting unit sets an assumed value of a generator total output amount based on the set power supply amount, the generator total output amount representing a sum of an electric power amount generated by the thermal power generation facility and a thermal energy amount supplied from the thermal power generation facility to the carbon dioxide recovery facility,
the predicting unit determines an operating output of the thermal power generation facility corresponding to the assumed value,
the predicting unit obtains a necessary heat quantity and a necessary power amount corresponding to the determined operating output and the target recovery rate based on the characteristic data,
the predicting unit obtains a heat efficacy based on the determined operating output and the characteristic data,
the predicting unit calculates the generator total output amount based on the necessary heat quantity, the necessary power, and the heat efficacy,
the predicting unit compares the calculated generator total output amount with the assumed value to verify the calculated generator total output,
the predicting unit obtains the fuel consumption amount and the recovery amount of carbon dioxide based on the verified generator total output amount.

17. A plant operation support method supporting operation of a plant including a thermal power generation facility and a carbon dioxide recovery facility which uses thermal energy and electrical power from the thermal power generation facility, the plant operation support method comprising:
setting a power supply amount to be supplied from the plant to an outside and a target recovery rate of carbon dioxide to be generated by the thermal power generation facility;
storing in a storage device characteristic data representing a capability of recovering carbon dioxide by the carbon dioxide recovery facility, the capability varying according to operating output of the thermal power generation facility; and
predicting a fuel consumption amount in the thermal power generation facility and a recovery amount of carbon dioxide in the carbon dioxide recovery facility based on contents set in the setting step and contents stored in the storing step;
wherein the step of predicting includes:
setting an assumed value of a generator total output amount based on the set power supply amount, the generator total output amount representing a sum of an electric power amount generated by the thermal power generation facility and a thermal energy amount supplied from the thermal power generation facility to the carbon dioxide recovery facility,
determining an operating output of the thermal power generation facility corresponding to the assumed value,
obtaining a necessary heat quantity and a necessary power amount corresponding to the determined operating output and the target recovery rate based on the characteristic data,
obtaining a heat efficacy based on the determined operating output and the characteristic data,
calculating the generator total output amount based on the necessary heat quantity, the necessary power, and the heat efficacy, comparing the calculated generator total output amount with the assumed value to verify the calculated generator total output,
obtaining the fuel consumption amount and the recovery amount of carbon dioxide based on the verified generator total output amount.

* * * * *